United States Patent
Dingli et al.

(10) Patent No.: US 11,360,181 B2
(45) Date of Patent: Jun. 14, 2022

(54) AUTHORITY VEHICLE MOVEMENT DIRECTION DETECTION

(71) Applicant: Pony AI Inc., Grand Cayman (KY)

(72) Inventors: Robert Dingli, Cupertino, CA (US); Peter G. Diehl, Shanghai (CN); Chen Yue Li, San Francisco, CA (US)

(73) Assignee: Pony AI Inc., Grand Cayman (KY)

( * ) Notice: Subject to any disclaimer, the term of this patent is extended or adjusted under 35 U.S.C. 154(b) by 286 days.

(21) Appl. No.: 16/671,077

(22) Filed: Oct. 31, 2019

(65) Prior Publication Data

US 2021/0132176 A1    May 6, 2021

(51) Int. Cl.
| | |
|---|---|
| *G01S 3/808* | (2006.01) |
| *G01S 3/803* | (2006.01) |
| *G05D 1/02* | (2020.01) |
| *G01C 21/34* | (2006.01) |

(Continued)

(52) U.S. Cl.
CPC .......... *G01S 3/8083* (2013.01); *G01S 3/8034* (2013.01); *B60T 7/12* (2013.01); *B60W 30/18163* (2013.01); *B60W 2420/54* (2013.01); *B60W 2554/00* (2020.02); *G01C 21/3415* (2013.01); *G05D 1/0214* (2013.01); *G05D 2201/0213* (2013.01)

(58) Field of Classification Search
CPC ........ G01S 3/80; G01S 3/8034; G01S 3/8083; G01S 15/931; B60W 40/04; B60W 30/18163; B60W 2420/54; B60W 2554/00; G05D 1/0214; G05D 1/0255; G05D 1/0289; G05D 2201/0213; G08G 1/00; B60T 7/12; B60T 7/22; B60T 2201/022; B60T 2210/32; G01C 21/3415
USPC .......................................................... 701/23
See application file for complete search history.

(56) References Cited

U.S. PATENT DOCUMENTS

| | | |
|---|---|---|
| 7,436,937 B2 | 10/2008 | Clawson |
| RE40,653 E | 3/2009 | Fleming, III |

(Continued)

FOREIGN PATENT DOCUMENTS

| | | | | |
|---|---|---|---|---|
| CA | 2938364 A1 | * | 7/2008 | ............. G01S 19/42 |
| DE | 102014225803 A1 | * | 6/2016 | |

(Continued)

*Primary Examiner* — Atul Trivedi
(74) *Attorney, Agent, or Firm* — Sheppard Mullin Richter & Hampton LLP

(57) ABSTRACT

Described herein are systems, methods, and non-transitory computer readable media for determining a direction of movement of an authority vehicle in relation to another vehicle such as an autonomous vehicle and initiating or ceasing a vehicle response measure that may have previously been initiated based on the determined direction of movement. A signal source associated with the authority vehicle emits a periodic acoustic signal that is received at one or more audio capture devices, which may be provided at various locations on an exterior of a vehicle. One or more signal characteristics of the acoustic signal can be determined such as frequency, sound intensity, and/or phase. Detected signal characteristic(s) of the acoustic signal can be analyzed, and in some cases, compared against known information such as an expected frequency of the acoustic signal to determine the direction of movement of the authority vehicle in relation to the vehicle.

18 Claims, 8 Drawing Sheets

(51) Int. Cl.
    *B60T 7/12*     (2006.01)
    *B60W 30/18*     (2012.01)

(56) References Cited

U.S. PATENT DOCUMENTS

| | | | |
|---|---|---|---|
| 7,576,679 B1 * | 8/2009 | Orr | G01S 19/42 |
| | | | 342/13 |
| 9,934,685 B1 * | 4/2018 | Bernhardt | G08G 1/095 |
| 10,269,242 B2 | 4/2019 | Ahmad et al. | |
| 2003/0218562 A1 * | 11/2003 | Orr | G01S 7/022 |
| | | | 342/20 |
| 2015/0260851 A1 * | 9/2015 | Orr | G01C 21/3658 |
| | | | 342/20 |
| 2017/0213459 A1 * | 7/2017 | Ogaz | G08G 1/166 |
| 2017/0249839 A1 * | 8/2017 | Becker | G08G 1/096725 |
| 2017/0305349 A1 * | 10/2017 | Naboulsi | B60R 1/025 |
| 2018/0211528 A1 * | 7/2018 | Seifert | G06V 20/56 |
| 2018/0284246 A1 * | 10/2018 | LaChapelle | H01L 27/14643 |
| 2018/0310159 A1 * | 10/2018 | Katz | H04M 3/5116 |
| 2019/0047578 A1 * | 2/2019 | Swan | G06V 20/597 |
| 2020/0398832 A1 * | 12/2020 | Tzirkel-Hancock | |
| | | | B60W 30/0953 |
| 2021/0078571 A1 * | 3/2021 | Zhu | B60W 60/001 |
| 2021/0125494 A1 * | 4/2021 | Cho | G01S 3/8083 |
| 2021/0132176 A1 * | 5/2021 | Dingli | G01S 3/8083 |
| 2021/0134317 A1 * | 5/2021 | Dingli | G08G 1/0965 |

FOREIGN PATENT DOCUMENTS

| | | | |
|---|---|---|---|
| JP | 2010067165 A | * | 3/2010 |
| JP | 2011215712 A | * | 10/2011 |
| WO | WO-2019130789 A1 | * | 7/2019 |

\* cited by examiner

AUTHORITY VEHICLE MOVEMENT DIRECTION DETECTION

The present invention relates generally to automated detection of the direction of movement of an authority vehicle, and more particularly, in some embodiments, to determining the direction of movement of an authority vehicle in relation to a vehicle based on characteristics of acoustic signals emitted from the authority vehicle and received by audio capture devices associated with the vehicle.

BACKGROUND

A vehicle, such as an autonomous vehicle (AV), includes a myriad of sensors that provide continuous streams of sensor data captured from the vehicle's surrounding environment. Such sensor data enables an AV to perform a number of functions that would otherwise be performed by a manual human operator including various vehicle navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

Certain on-board vehicle sensors provide sensor data that bolsters a vehicle's field-of-view such as cameras, light detection and ranging (LiDAR)-based systems, radar-based systems, Global Positioning System (GPS) systems, sonar-based sensors, ultrasonic sensors, accelerometers, gyroscopes, magnetometers, inertial measurement units (IMUs), and far infrared (FIR) sensors. Real-time spatial information can be determined from sensor data captured by such on-board sensors located throughout the vehicle, which may then be processed to calculate various vehicle parameters and determine safe driving operations of the vehicle.

While an AV can include a variety of on-board sensors for enhancing the vehicle's field-of-view, autonomous vehicle technology suffers from various technical drawbacks relating to detecting and utilizing audio characteristics of a vehicle's surrounding environment to aid in the vehicle's operations. Described herein are technical solutions that address at least some of these drawbacks.

SUMMARY

Described herein are systems, methods, and non-transitory computer readable media for the automated detection of the direction of movement of an authority vehicle in relation to another vehicle. In example embodiments, acoustic signals emitted from a signal source associated with an authority vehicle are received at audio capture devices associated with a vehicle. Signal characteristics of the acoustic signals can be determined including, without limitation, a frequency, a sound intensity, and/or a phase of the acoustic signals. The signal characteristics may then be analyzed and potentially compared against known information such as an expected frequency of the acoustic signals to determine the direction of movement of the authority vehicle in relation to the vehicle.

If the authority vehicle is determined to be moving towards the vehicle (e.g., a distance between the authority vehicle and the vehicle is decreasing over time), a vehicle response measure may be initiated. In example embodiments in which the vehicle is an AV, the vehicle response measure may include, without limitation, raising an alertness level of the AV, performing an automated braking operation, performing an automated lane changing operation, modifying a navigation route being traversed by the vehicle, and so forth. If the authority vehicle is determined to be moving away from the vehicle (e.g., a distance between the authority vehicle and the vehicle is increasing over time), no vehicle response measure may be initiated, or in the alternative, a vehicle response measure previously initiated may be ceased. For instance, if an AV was automatically brought to a stop at a location outside of a travel path of an authority vehicle as a vehicle response measure taken in response to determining that an authority vehicle was moving towards the AV, then the AV may be controlled to once again resume its navigation path in response to determining that the authority vehicle has passed the AV is now moving away from the AV.

In an example embodiment of the invention, a method for determining a direction of movement of an authority vehicle in relation to a vehicle includes receiving, at one or more audio capture devices associated with the vehicle, an acoustic signal emitted from a signal source associated with the authority vehicle. The method further includes determining one or more signal characteristics of the acoustic signal and determining the direction of movement of the authority vehicle based at least in part on the one or more signal characteristics.

In another example embodiment of the invention, a system for determining a direction of movement of an authority vehicle in relation to a vehicle includes at least one processor and at least one memory storing computer-executable instructions. The at least one processor is configured to access the at least one memory and execute the computer-executable instructions to perform a series of operations. In an example embodiment, the series of operations includes receiving, at one or more audio capture devices associated with the vehicle, an acoustic signal emitted from a signal source associated with the authority vehicle. The series of operations further include determining one or more signal characteristics of the acoustic signal and determining the direction of movement of the authority vehicle based at least in part on the one or more signal characteristics.

In another example embodiment of the invention, a computer program product for determining a direction of movement of an authority vehicle in relation to a vehicle is disclosed. The computer program product includes a non-transitory computer-readable medium readable by a processing circuit, where the non-transitory computer-readable medium stores instructions executable by the processing circuit to cause a method to be performed. In an example embodiment, the method includes receiving, at one or more audio capture devices associated with the vehicle, an acoustic signal emitted from a signal source associated with the authority vehicle. The method further includes determining one or more signal characteristics of the acoustic signal and determining the direction of movement of the authority vehicle based at least in part on the one or more signal characteristics.

Example embodiments of the invention include the following additional features and aspects that can be implemented, in any combination, in connection with the above-described method, system, and/or computer program product. In some example embodiments, determining one or more signal characteristics of the acoustic signal includes determining at least one of a frequency of the acoustic signal, a sound intensity of the acoustic signal, or a phase of the acoustic signal.

In some example embodiments in which a frequency of the acoustic signal is determined, determining the direction of movement of the authority vehicle includes determining an expected frequency of the acoustic signal, determining that the frequency of the acoustic signal is greater than the expected frequency of the acoustic signal, and determining that the authority vehicle is moving towards the vehicle responsive at least in part to determining that the frequency of the acoustic signal is greater than the expected frequency of the acoustic signal.

In some example embodiments in which a frequency of the acoustic signal is determined, determining the direction of movement of the authority vehicle includes determining an expected frequency of the acoustic signal, determining that the frequency of the acoustic signal is less than the expected frequency of the acoustic signal, and determining that the authority vehicle is moving away from the vehicle responsive at least in part to determining that the frequency of the acoustic signal is less than the expected frequency of the acoustic signal.

In some example embodiments, an electronic control unit (ECU) or the like of a vehicle may be pre-programmed to recognize a set of frequencies and to correlate the frequencies with authority vehicles. In some example embodiments, the ECU may be able to correlate specific frequencies with specific types of authority vehicles. In some example embodiments, the specific frequencies that an ECU is programmed to recognize as corresponding to authority vehicles may differ based on which geographic region that vehicle is located in.

In some example embodiments in which a sound intensity of a first acoustic signal is determined, a second acoustic signal emitted from the signal source associated with the authority vehicle is received at the one or more audio capture devices and a sound intensity of the second acoustic signal is determined. In example embodiments, the first acoustic signal is emitted, at least in part, when the authority vehicle is at a first location at a first time period and the second acoustic signal is emitted, at least in part, when the authority vehicle is at a second location different from the first location at a second time period after the first time period.

In some example embodiments, determining the direction of movement of the authority vehicle includes determining that the sound intensity of the second acoustic signal is greater than the sound intensity of the first acoustic signal and determining that the authority vehicle is moving towards the vehicle responsive at least in part to determining that the sound intensity of the second acoustic signal is greater than the sound intensity of the first acoustic signal.

In some example embodiments, determining the direction of movement of the authority vehicle includes determining that the sound intensity of the second acoustic signal is less than the sound intensity of the first acoustic signal and determining that the authority vehicle is moving away from the vehicle responsive at least in part to determining that the sound intensity of the second acoustic signal is less than the sound intensity of the first acoustic signal.

In some example embodiments, the acoustic signal is received at a first audio capture device and a first phase of the acoustic signal is determined. Further, in some example embodiments, the acoustic signal is also received at a second audio capture device and a second phase of acoustic signal is determined. Moreover, in some example embodiments, a relative phase difference between the first phase of the acoustic signal and the second phase of the acoustic signal is determined, a difference in time of receipt of the acoustic signal at the first audio capture device and time of receipt of the acoustic signal at the second audio capture device is determined based at least in part on the relative phase difference, and a location of the authority vehicle in relation to the vehicle is determined responsive, at least in part, to determining the difference in time of receipt of the acoustic signal at the first audio capture device and time of receipt of the acoustic signal at the second audio capture device. Further, in some example embodiments, whether to initiate a vehicle response measure is determined based at least in part on 1) the location of the authority vehicle in relation to the vehicle, 2) the direction of movement of the authority vehicle, and 3) additional sensor data such as image data from one or more image capture devices on-board the vehicle.

In some example embodiments, signal characteristic(s) of an acoustic signal emitted from a signal source associated with an authority vehicle can be analyzed to determine not only a direction of movement of the authority vehicle in relation to another vehicle, but also a speed of the authority vehicle and/or an instantaneous location of the authority vehicle in relation to the vehicle. For instance, in some example embodiments, a relationship between a detected frequency of an acoustic signal and an expected frequency of the acoustic signal can be used to determine a speed of the authority vehicle based, for example, on the Doppler effect. Further, in some example embodiments, a relative phase difference between the receipt of an acoustic signal at different audio capture devices of a vehicle, and the difference in time of flight of the acoustic signal determined there from, can be used to determine a location, in relation to the vehicle, of an authority vehicle from which the acoustic signal is emitted.

In some example embodiments in which the authority vehicle is determined to be moving towards the vehicle, a vehicle response measure is initiated. The vehicle response measure includes at least one of a raised vehicle alertness level, an automated braking operation, an automated lane changing operation, or an automated navigation route modification. In some example embodiments in which the authority vehicle is determined to be moving away from the vehicle, no vehicle response measure may be initiated or a previously initiated vehicle response measure may be ceased.

In some example embodiments, an audio capture device is a microphone located on an exterior of the vehicle. In some example embodiments, an audio capture device is an ultrasonic sensor of the vehicle. In some example embodiments, one or more of the audio capture devices at located, at least partially, within an interior of the vehicle. Moreover, in some example embodiments, an array of multiple microphones are provided at various locations on an exterior of the vehicle. Further, in some example embodiments, the vehicle is an autonomous vehicle.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
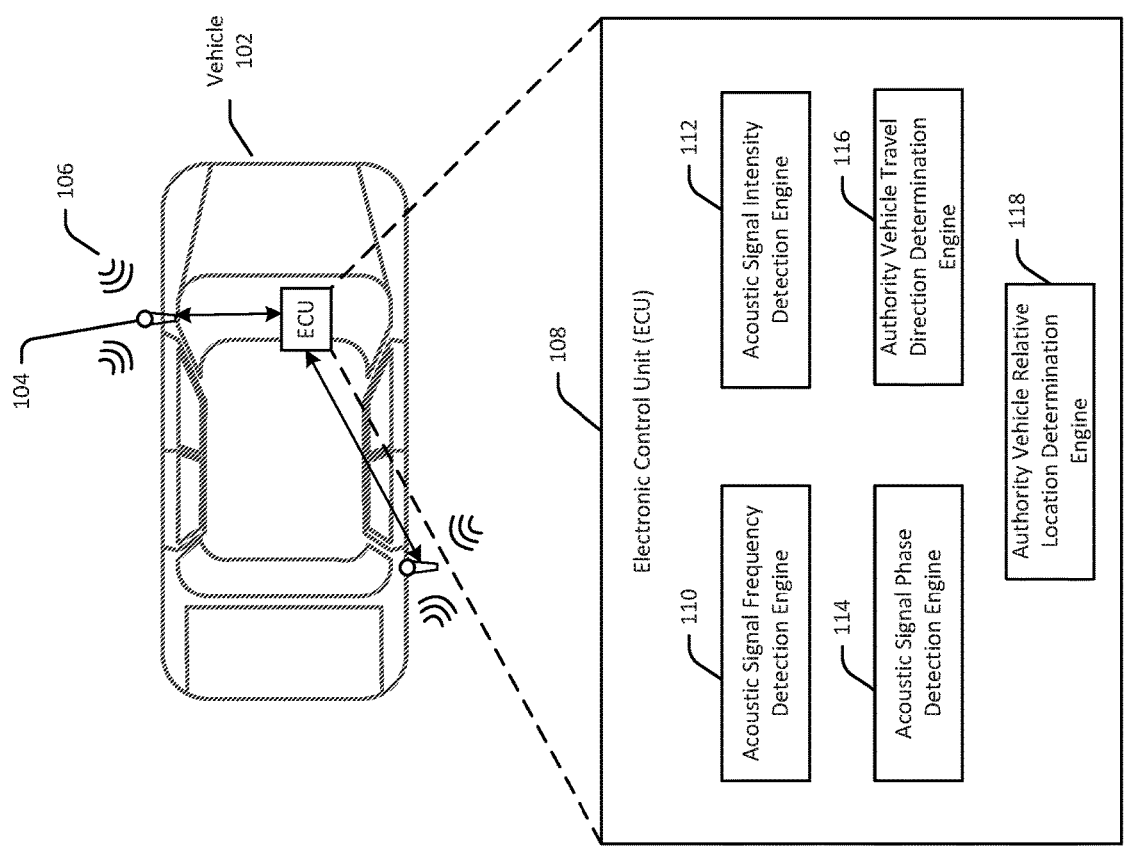
FIG. 1 schematically illustrates example components of an electronic control unit of a vehicle that is configured to implement automated determination of a direction of movement of an authority vehicle in relation to the vehicle in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises," "comprising," "includes," "including," "contains," or "containing" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents and vice versa unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

A claimed solution rooted in computer technology overcomes problems specifically arising in the realm of computer technology. Described herein are systems, methods, and non-transitory computer readable media for determining a direction of movement of an authority vehicle in relation to another vehicle such as an autonomous vehicle and initiating or ceasing a vehicle response measure that may have previously been initiated based on the determined direction of movement. In example embodiments, a signal source associated with an authority vehicle emits a periodic acoustic signal that is received at one or more audio capture devices provided at various locations on an exterior of a vehicle. One or more signal characteristics of the acoustic signal may be determined including, without limitation, a frequency, a sound intensity, and/or a phase of the acoustic signal. Detected signal characteristic(s) of the acoustic signal can be analyzed, and in some example embodiments, compared against known information such as an expected frequency of the acoustic signal to determine the direction of movement of the authority vehicle in relation to the vehicle.

An authority vehicle may include any vehicle (e.g., an ambulance, a police car, a fire truck, etc.) that provides an emergency service and that is capable of emitting a periodic acoustic signal from a siren or the like that, when detected by an operator of a vehicle, for example, indicates to the vehicle operator 1) that the authority vehicle may be in proximity to the vehicle and 2) that measures may need to be taken to avoid a travel path of the authority vehicle.

In example embodiments, if the authority vehicle is determined to be moving towards the vehicle (e.g., a distance between the authority vehicle and the vehicle is decreasing over time), a vehicle response measure may be initiated. In example embodiments in which the vehicle is an AV, the vehicle response measure may include, without limitation, raising an alertness level of the AV, performing an automated braking operation, performing an automated lane changing operation, modifying a navigation route being traversed by the vehicle, and so forth.

Assuming the vehicle is an AV, in some example embodiments, if the authority vehicle is determined to be moving towards the vehicle, a first vehicle response measure taken may be to raise an alertness level of the vehicle. The raised alertness level may trigger the analysis of additional sensor data to determine whether a further vehicle response measure should be initiated. For instance, image data captured by one or more on-board cameras may be analyzed to determine a navigation path being taken by the authority vehicle. In example embodiments, if the image data indicates that the authority vehicle is approaching the vehicle from behind a direction of movement/travel of the vehicle and within a same travel lane as the vehicle, an automated lane changing operation may be initiated, and optionally, an automated braking operation may be initiated to decrease a speed of the vehicle or bring the vehicle to a complete stop. In other example embodiments, if the image data indicates that the authority vehicle is approaching the vehicle from behind a direction of movement/travel of the vehicle but in a different travel lane than the vehicle, an automated braking operation to decrease a speed of the vehicle or bring the vehicle to a complete stop may be initiated but a lane changing operation may not be necessary. It should be appreciated that the authority vehicle being "behind" the vehicle refers to any instantaneous location of the authority vehicle that is within a geographic region that extends from a line perpendicular to the vehicle's instantaneous direction of movement/travel in a direction that opposes the vehicle's direction of movement/travel.

In other example embodiments, the image data may indicate that the authority vehicle is approaching the vehicle from in front of a direction of movement/travel of the vehicle. It should be appreciated that the authority vehicle being "in front of" the vehicle refers to any instantaneous location of the authority vehicle that is within a geographic region that extends from a line perpendicular to the vehicle's instantaneous direction of movement/travel in a direction that coincides with the vehicle's direction of movement/travel. In such an example scenario, a vehicle response measure may or may not be necessary depending on, for example, the particular travel paths being taken by the authority vehicle and the vehicle and the corresponding map layout. For example, if the authority vehicle is approaching the vehicle in the opposing direction on a road surface that includes a barrier between the opposing directions of traffic, and the vehicle will not encounter any road intersection via which the authority vehicle may be able to turn into or otherwise cross the travel path of the vehicle, then no additional vehicle response measure may be necessary beyond the initial raising of the alertness level. Rather, the vehicle may be allowed to continue along its travel path without any deviation in navigation, speed, acceleration, or the like necessitated by the presence of the authority vehicle. In contrast, as another non-limiting example, if the authority vehicle is approaching the vehicle in the opposing direction on a road surface that does not include a barrier between the opposing directions of traffic, or if the vehicle will encounter a road intersection via which the authority vehicle may be able to turn into or otherwise cross the travel path of the vehicle, then one or more additional vehicle response measures may be initiated including, without limitation, an automated braking operation, an automated lane changing operation, a modification to a navigation route being followed by the vehicle, or the like.

In some example embodiments, a vehicle response measure such as an automated braking operation is automatically initiated responsive to determining that an authority vehicle is approaching the vehicle from behind the vehicle. In other example embodiments, a vehicle alertness level is first raised responsive to determining that an authority vehicle is approaching the vehicle from behind the vehicle. Then, after the vehicle alertness level is raised, additional sensor data (e.g., LiDAR data, image data, radar data, etc.) may be analyzed to determine a travel path of the authority vehicle in relation to a travel path of the vehicle, and thus, any additional vehicle response measures to be taken such as an automated lane changing operation, a vehicle navigation route modification, or the like. In some example embodiments, the vehicle alertness level may be increased responsive to determining that an authority vehicle is travelling towards the vehicle from in front of the vehicle, prior to any other vehicle response measures being taken, if necessary.

In some example embodiments, as an alternative to or in addition to image data, signal characteristics of an acoustic signal emitted from an authority vehicle can be analyzed to determine an authority vehicle's location in relation to the vehicle. For instance, the phase of an acoustic signal, or more specifically, the relative phase difference between an acoustic signal received at different audio capture devices of a vehicle can be used to echo-locate the authority vehicle in relation to the vehicle.

In particular, in some example embodiments, an acoustic signal emitted from a signal source associated with an authority vehicle is received at a first audio capture device associated with a vehicle and a first phase of the acoustic signal is determined. The acoustic signal may also be received at a second audio capture device of the vehicle, and a second phase of acoustic signal may be determined. A relative phase difference between the first phase of the acoustic signal and the second phase of the acoustic signal may then be determined, and a difference in time of receipt of the acoustic signal at the first audio capture device and time of receipt of the acoustic signal at the second audio capture device may be determined based at least in part on the relative phase difference. A location of the authority vehicle in relation to the vehicle can then be determined based on the difference in time of receipt of the acoustic signal at the first audio capture device and time of receipt of the acoustic signal at the second audio capture device.

For instance, if the acoustic signal is first received at a microphone that is located closer to the front of the vehicle than a microphone located closer to the rear of the vehicle, the authority vehicle may be determined to be in front of the vehicle. Conversely, if the acoustic signal is first received at a microphone that is located closer to the rear of the vehicle than a microphone located closer to the front of the vehicle, the authority vehicle may be determined to be in behind the vehicle. In some embodiments, a vehicle response measure may not be initiated if the authority vehicle is moving away from the vehicle regardless of whether the authority vehicle is located in front of or behind the vehicle. In some example embodiments, if the authority vehicle is determined to be moving towards the vehicle, the location of the authority vehicle in relation to the vehicle may impact whether a vehicle response measure (other than raising a vehicle alertness level) is automatically initiated, or in the alternative, whether the vehicle alertness level is first raised and additional sensor data (e.g., image data) is used to determine whether additional vehicle response measures should be initiated and/or which additional measures to be taken.

In some example embodiments, signal characteristic(s) of an acoustic signal emitted from a signal source associated with an authority vehicle can be analyzed to determine not only a direction of movement of the authority vehicle or a location of the authority vehicle in relation to another vehicle, but also a speed of the authority vehicle. For instance, in some example embodiments, a relationship between a detected frequency of an acoustic signal and an expected frequency of the acoustic signal can be used to determine a speed of the authority vehicle based, for example, on the Doppler effect. Once determined, the speed of the authority vehicle can be assessed, along with other factors such as the location of the authority vehicle in relation to the vehicle, to determine which vehicle response measure(s) to take and/or what parameters to select for the vehicle response measure(s). For instance, the speed of an authority vehicle can be used to determine how quickly to decelerate a vehicle as part of an automated braking operation.

In example embodiments, if the authority vehicle is determined to be moving away from the vehicle (e.g., a distance between the authority vehicle and the vehicle is increasing over time), no vehicle response measure may be initiated, or in the alternative, a vehicle response measure previously initiated may be ceased. For instance, if an AV was automatically brought to a stop at a location outside of a travel path of an authority vehicle as a vehicle response measure taken in response to determining that an authority vehicle was moving towards the AV, then the AV may be controlled to once again resume its navigation path in response to determining that the authority vehicle has passed the AV is now moving away from the AV.

Various embodiments of the invention overcome technical problems specifically arising in the realm of computer-based technology, and more specifically, in the realm of autonomous vehicle technology. In particular, example embodiments of the invention provide technical solutions to technical problems relating to the operation and control of autonomous vehicles, specifically, by utilizing signal characteristics of acoustic signals detected in a vehicle's surrounding environment to improve autonomous vehicle operation. More specifically, example embodiments of the invention provide a technical solution to the technical problem of detecting a direction of movement/travel of an authority vehicle in relation to a vehicle and potentially taking one or more vehicle response measures in response thereto in scenarios in which there is no human vehicle operator available to manually make such determinations such as in scenarios involving a driverless or autonomous vehicle.

Example embodiments of the invention include a number of technical features that provide the aforementioned technical solution. For instance, example embodiments of the invention include the technical feature of providing an array of audio capture devices such as microphones at an exterior of a vehicle to capture acoustic signals such as those emitted by signal sources associated with authority vehicles. Example embodiments of the invention also include the technical feature of determining one or more signal characteristics of acoustic signals received at the audio capture devices such as frequency, sound intensity, and/or phase to determine a direction of movement/travel of the authority vehicle in relation to a vehicle and/or a location of the authority vehicle in relation to a vehicle. Example embodiments of the invention still further include the technical feature of initiating various vehicle response measures, or raising a vehicle alertness level to assess additional sensor data to determine whether and which vehicle response measures to initiate, in response to determining a direction of movement/travel of an authority vehicle in relation to a vehicle and/or a location of an authority vehicle in relation to a vehicle.

The aforementioned technical features individually and in combination provide a technical solution to the technical problem of determining a direction of movement/travel of an authority vehicle in relation to a vehicle and potentially taking measures in response thereto in the absence of a human vehicle operator such as in autonomous vehicle scenarios. This technical solution constitutes a technological improvement that is necessarily rooted in computer-based autonomous vehicle technology.

FIG. 1 schematically illustrates example components of an electronic control unit of a vehicle that is configured to implement automated determination of a direction of movement of an authority vehicle in relation to the vehicle in accordance with an example embodiment of the invention. Referring now to FIG. 1, a vehicle 102 is depicted. In some example embodiments, the vehicle 102 may be an autonomous vehicle (AV), a driverless vehicle, or the like. In some example embodiments, while the vehicle 102 may be capable of operating autonomously without input from a human vehicle operator, a human may nonetheless be present in the vehicle 102 and may be provided with the capability to take over at least partial manual control of the vehicle 102 by providing some form of visual, audible, and/or tactile input to the vehicle 102.

In example embodiments, one or more audio capture devices 104 may be provided at or along an exterior of the vehicle 102. In some example embodiments, an array of multiple audio capture devices 104 may be provided at various locations along an exterior of the vehicle 102 such that the multiple audio capture devices 104 are cumulatively able to detect acoustic signals 106 received from any direction around the vehicle 102. Further, in some example embodiments, one or more of the audio capture devices 104 may be provided, at least partially, within an interior of the vehicle 102. In example embodiments, the audio capture devices 104 may be any type of acoustic sensor including, without limitation, microphones configured to detect acoustic signals in a human-audible frequency range, ultrasonic sensors/transducers, or the like. In some example embodiments, the audio capture devices 104 may be existing ultrasonic sensors already provided on the vehicle 102, and which may be used as passive ultrasonic sensors to act as microphones for detecting acoustic signals in an environment around the vehicle 102. In some example embodiments, one or more of the audio capture devices 104 may be a microphone attached or otherwise integrated with an exterior of the vehicle 102 for the purpose of detecting acoustic signals in the environment surrounding the vehicle 102.

In example embodiments, an electronic control unit (ECU) 108 of the vehicle 102 may be configured to perform an automated determination of a direction of movement/travel of an authority vehicle in relation to the vehicle 102 and/or an automated determination of a location of an authority vehicle in relation to the vehicle 102. Further, in example embodiments, the ECU 108 may be further configured to initiate one or more vehicle response measures based on the determined direction of movement/travel of the authority vehicle in relation to the vehicle 102 and/or the determined location of the authority vehicle in relation to the vehicle 102. Moreover, in some example embodiments, the ECU 108 may be configured to assess other forms of sensor data (e.g., image data) to determine whether to initiate a vehicle response measure, a type of vehicle response measure to initiate, and/or one or more parameters to select for a vehicle response measure. While example embodiments may be described herein in connection with the ECU 108 configured to perform methods and techniques of the invention, it should be appreciated that one or more other systems of the vehicle 102 and/or one or more remote systems may be configured to perform some or all of the functions described herein as being performed by the ECU 108.

In example embodiments, the ECU 108 includes an acoustic signal frequency detection engine 110, an acoustic signal intensity detection engine 112, an acoustic signal phase detection engine 114, an authority vehicle travel direction determination engine 116, and an authority vehicle relative location determination engine 118. In example embodiments, the acoustic signal frequency detection engine 110 may be configured to detect a frequency of the acoustic signals 106 received at the audio capture devices 104. More specifically, in example embodiments, the acoustic signal frequency detection engine 110 may be configured to detect a frequency of an acoustic signal 106 received at an audio capture device 104 (e.g., an acoustic signal 106 emitted from a signal source such as a siren of an authority vehicle) and compare the detected frequency against expected frequencies that the engine 110 is programmed to recognize. In example embodiments, output from the engine 110 can be provided as input to the authority vehicle travel direction determination engine 116, which may be configured to determine a direction of movement of the authority vehicle in relation to the vehicle 102 based on the deviation between the detected frequency and the expected frequency of the acoustic signal 106. In other example embodiments, other signal characteristics of the acoustic signals 106 may be detected and used to determine a direction of movement of an authority vehicle in relation to the vehicle 102. For instance, in example embodiments, the acoustic signal intensity detection engine 112 may be configured to detect a respective sound intensity of different acoustic signals 106 emitted from an authority vehicle and received at an audio capture device 104, and the engine 116 may be configured to determine a direction of movement/travel of the authority vehicle in relation to the vehicle 102 based on the difference in sound intensity. Operation of the engines 110, 112 will be described in more detail later in this disclosure.

In example embodiments, the ECU 108 may also be configured to determine a location of an authority vehicle in relation to the vehicle 102. More specifically, in example embodiments, the acoustic signal phase detection engine 114 may be configured to detect a phase of an acoustic signal 106 received at an audio capture device 104. For instance, the acoustic signal phase detection engine 114 may detect a first phase of an acoustic signal 106 received at a first audio capture device 104 and a second phase of the acoustic signal 106 received at a second audio capture device 104. The acoustic signal phase detection engine 114 may then determine a relative phase difference between the first phase and the second phase, and may further determine a difference in time of receipt of the acoustic signal 106 at the first audio capture device 104 and the second audio capture device 104 based on the relative phase difference. In example embodiments, the authority vehicle relative location determination engine 118 may then determine a relative location of the authority vehicle in relation to the vehicle 102 based on the difference in time of receipt of the acoustic signal 106. In other example embodiments, the engine 114 may determine the relative phase difference and provide that as input to the engine 118, which in turn, may determine the difference in time of receipt of the acoustic signal 106 and the relative location of the authority vehicle in relation to the vehicle 102. Operation of the engines 114, 116 will be described in more detail later in this disclosure.

Figure 2A:
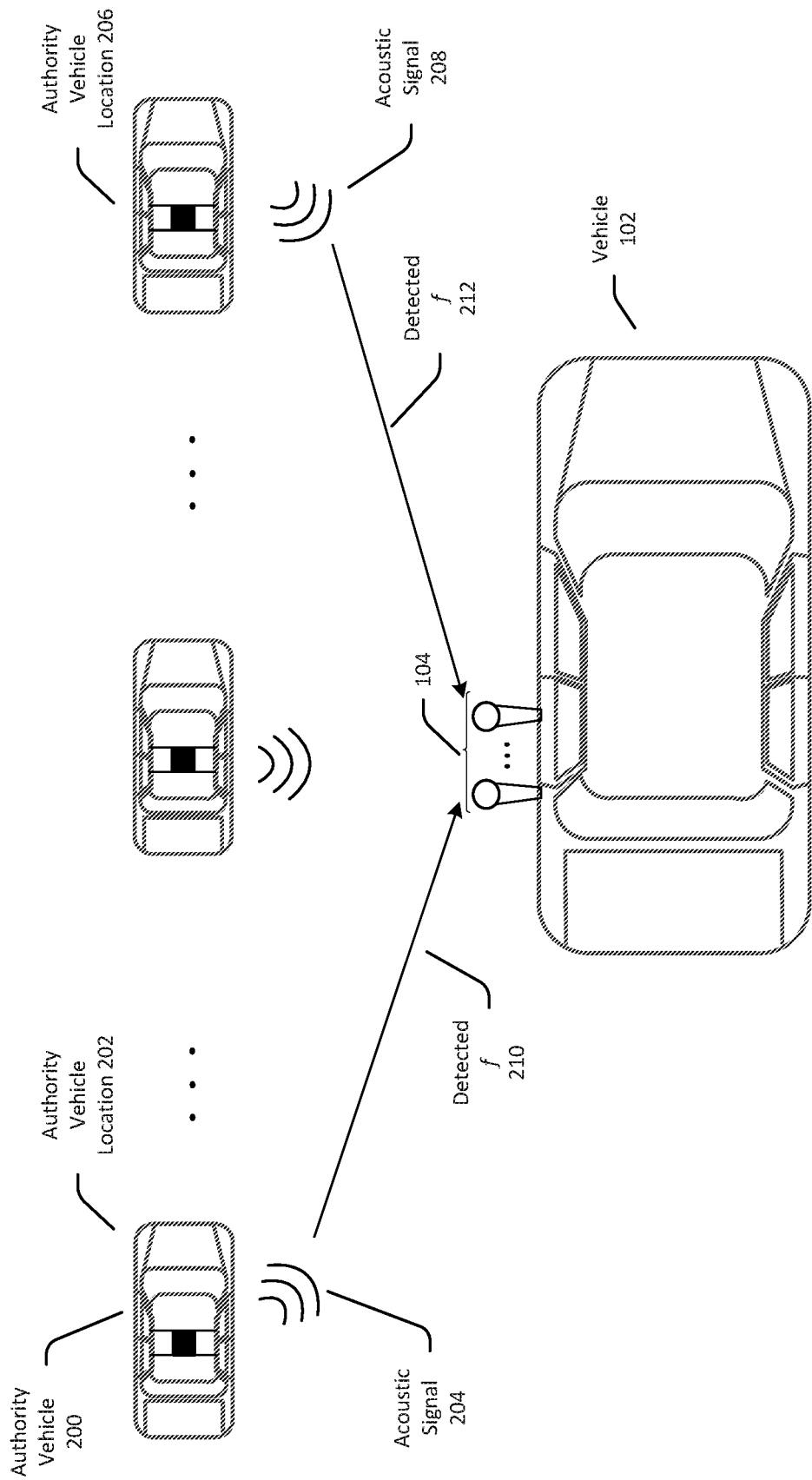
FIG. 2A schematically illustrates automated determination of a direction of movement of an authority vehicle in relation to a vehicle based on a frequency of an acoustic signal emitted from a signal source associated with the authority vehicle and received at one or more audio capture devices associated with the vehicle in accordance with an example embodiment of the invention.
Figure 3:
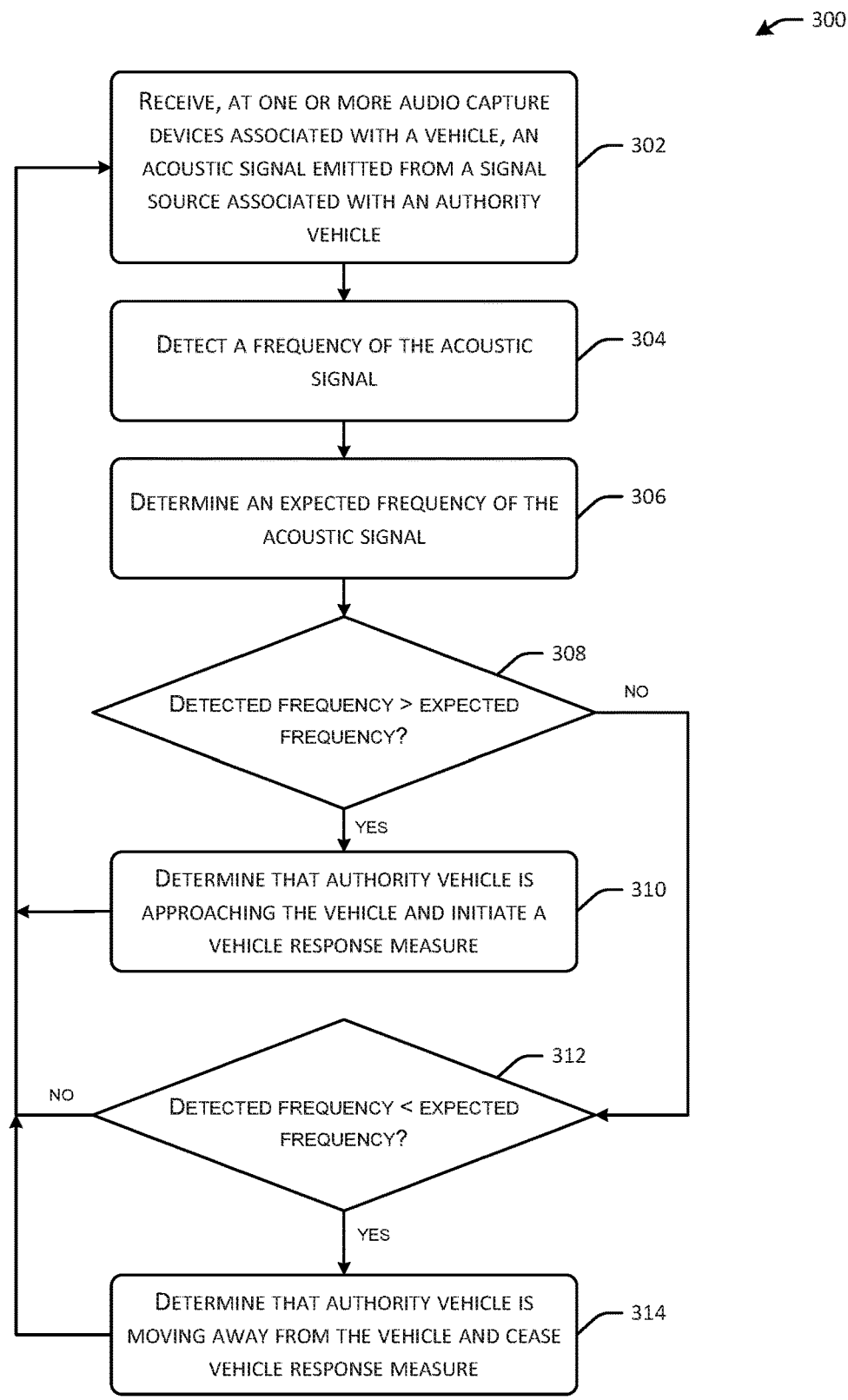
FIG. 3 is a process flow diagram of an illustrative method for automated determination of a direction of movement of an authority vehicle in relation to a vehicle based on a frequency characteristic of acoustic signals emitted from a signal source associated with the authority vehicle in accordance with an example embodiment of the invention.

FIG. 2A schematically illustrates automated determination of a direction of movement of an authority vehicle in relation to a vehicle based on a frequency of an acoustic signal emitted from a signal source associated with the authority vehicle and received at one or more audio capture devices associated with the vehicle in accordance with an example embodiment of the invention. FIG. 3 is a process flow diagram of an illustrative method 300 for automated determination of a direction of movement of an authority vehicle in relation to a vehicle based on a frequency characteristic of acoustic signals emitted from a signal source associated with the authority vehicle in accordance with an example embodiment of the invention. FIG. 3 will be described referencing FIGS. 1 and 2A hereinafter.

Referring now to FIG. 3 in conjunction with FIG. 2A, at block 302 of the method 300, an acoustic signal emitted from a signal source associated with an authority vehicle 200 may be received at one or more audio capture devices 104 of the vehicle 102. In some example embodiments, the signal source may be a siren or similar device capable of emitting a periodic acoustic signal. In some example embodiments, the acoustic signal received at block 302 may be an acoustic signal 204 emitted or received while the authority vehicle 200 is in location 202 in relation to the vehicle 102. Authority vehicle location 202 may be a location that is behind a direction of travel of the vehicle 102, as previously defined herein. In other example embodiments, the acoustic signal received at block 302 may be an acoustic signal 208 emitted or received while the authority vehicle is at location 206 in relation to the vehicle 102. Authority vehicle location 206 may be a location that is front of a direction of travel of the vehicle 102, as previously defined herein. It should be appreciated that acoustic signals 204, 208 are merely representative, and that the authority vehicle 200 may emit a continuous periodic acoustic signal and/or multiple acoustic signals periodically as the authority vehicle 200 travels along a travel path. It should further be appreciated that acoustic signals emitted from the authority vehicle 200 may only be detectable by the audio capture devices 104 of the vehicle 102 when the authority vehicle 200 is within a particular radius of the vehicle 102. That is, an acoustic signal emitted from the authority vehicle 200 may only be detectable at the audio capture devices 104 if it has at least a threshold sound intensity at the point at which it reaches an audio capture device.

Continuing with a description of the example method 300, at block 304 of the method 300, the acoustic signal frequency detection engine 110 may detect a frequency of the acoustic signal received at block 302. For instance, referring to FIG. 2A, the engine 110 may detect frequency 210 of the acoustic signal 204 that is emitted or received while the authority vehicle 200 is at location 202 with respect to the vehicle 102. As another non-limiting example, the engine 110 may detect frequency 212 of the acoustic signal 208 that is emitted or received while the authority vehicle 200 is at location 206 with respect to the vehicle 102. In example embodiments, the engine 110 may include or be communicatively coupled to a frequency meter configured to measure the frequency of acoustic signals received at the audio capture devices 104. More specifically, in some example embodiments, an acoustic signal received at an audio capture device 104 may be converted to an electrical signal by the device 104 itself or by another device. A frequency meter may then measure the frequency of the electrical signal, which in turn, is the frequency of the corresponding acoustic signal.

Continuing with the description of the example method 300, at block 306 of the method 300, the engine 110 may determine an expected frequency of the acoustic signal received at block 302. In particular, the ECU 108, or more specifically, the acoustic signal frequency detection engine 110 may be pre-programmed to recognize a set of frequencies as corresponding to acoustic signals emitted from authority vehicles that operate in a geographic region encompassing a current location of the vehicle 102. In some example embodiments, as the vehicle 102 enters into a new area monitored by authority vehicles that emit acoustic signals across a different set or range of frequencies than a previous area traversed by the vehicle 102, the engine 110 may be configured to automatically detect the new set or range of expected frequencies for authority vehicles in the new area by, for example, accessing stored mappings of sets or ranges of expected authority vehicle acoustic signal frequencies to regions of map data. Further, in some example embodiments, the engine 110 may be configured to associate particular expected acoustic signal frequencies with particular types of authority vehicles.

At block 308 of the method 300, the authority vehicle travel direction determination engine 116 may determine whether the detected frequency of the acoustic signal received at block 302 is greater than its expected frequency. More specifically, at block 308, the engine 116 may receive the detected and expected frequencies as input from the engine 110 and perform the comparison. Alternatively, the engine 110 may perform the comparison at block 308. If, for example, the acoustic signal 204 is received at block 302, the engine 116 may make a positive determination at block 308 that the detected frequency 210 is greater than the expected frequency of the acoustic signal 204. In particular, because the acoustic signal 204 is emitted from the authority vehicle 200 while the authority vehicle 200 is at location 202 behind a direction of travel of the vehicle 102, the detected frequency 210 may be determined to be greater than the expected frequency of the acoustic signal 204 due to the Doppler effect (also known as the Doppler shift).

The Doppler effect refers to the change in detected of a wave in relation to an observer that is moving relative to the source of the wave. The Doppler effect occurs because when the sources of waves is moving towards an observer, each successive wave crest is emitted from a position that is closer to the observer than the crest of the previous wave. As such, each successive wave takes slightly less time to reach the observer than the previous wave. As a result, the time between arrivals of successive wave crests at the observer is reduced, thereby causing an increase in the frequency. Conversely, if the source of waves is moving away from the observer, each wave is emitted from a position that is farther from the observer than the previous wave such that the arrival times between successive waves at the observer is increased and the frequency is corresponding decreased. When the wave source is moving towards the observer, the distance between successive wave fronts is reduced resulting in a "bunching together" of the waves. On the other hand, when the wave source is moving away from the observer, the distance between successive wave fronts is increased resulting in a "spreading out" of the waves.

In classical physics, where the speeds of a wave source and a wave receiver relative to the medium through which the waves propagate are lower than the velocity of waves in the medium, the relationship between the frequency observed at the wave receiver (observed frequency f) and the emitted $v_r$ frequency $f_0$ is given by: $f=(c\pm Vr/c\pm Vs)=f_0$, where c is the propagation speed of waves in the medium; Vr is the speed of the receiver relative to the medium, added to c if the receiver is moving towards the source, subtracted if the receiver is moving away from the source; and Vs is the speed of the source relative to the medium, added to c if the source is moving away from the receiver, subtracted if the source is moving towards the receiver. In the example scenario depicted in FIG. 2A, c may represent the speed of sound in air; Vs may represent the speed of the authority vehicle 200 relative to air; and Vr may represent the speed of the vehicle 102 relative to air. If the speeds Vs and Vr are small compared to the speed of the wave (which is the case for the speed of vehicle 102 and the speed of authority vehicle 200 compared to the speed of sound), the relationship between observed frequency f and emitted frequency f0 is approximately given by: $f=(1+\Delta v/c)f_0$, which implies that $\Delta f=(\Delta v/c)f_0$, where $\Delta f=f-f_0$ and $\Delta v=-(Vr-Vs)$. The quantity $\Delta v$ represents the opposite of the velocity of the receiver relative to the source and is positive when the source and the receiver are moving towards each other.

Referring to the example depicted in FIG. 2A, $\Delta v$ may be positive under any of a variety of scenarios such as when the authority vehicle 200 is approaching the vehicle 102 from behind at a greater speed than the vehicle 102; when the authority vehicle 200 and the vehicle 102 are approaching one another while traveling in opposing directions; and so forth. Further, $\Delta v$ is positive when the detected frequency is greater than the emitted frequency. As such, if the acoustic signal 204 is received at block 302, the detected frequency 210 of the acoustic signal 204 would be determined to be greater than the expected frequency (the emitted frequency of acoustic signal 204), in which case, the authority vehicle 200 would be determined, at block 310 of the method 300, to be approaching (moving towards) the vehicle 102 because the quantity $\Delta v$ would be positive.

In some example embodiments, the formulas presented above assume that the source is either directly approaching or receding from the observer. If the source, however, approaches the observer at an angle (but still assuming a constant velocity), the observed frequency that is first heard may be higher than the emitted frequency at the source. Thereafter, there may be a monotonic decrease in the observed frequency as the source gets closer to the observer, through equality when the wave is coming from a direction perpendicular to the relative motion, followed by a continued monotonic decrease in frequency as the source recedes from the observer. When the observer is close to a path of the source, the transition from high to low frequency may be abrupt. Whereas, when the observer is far from the path of the source, the transition from high to low frequency may be more gradual.

Continuing again with the description of the example method 300, in response to the positive determination at block 308 indicating that the authority vehicle 200 is moving towards the vehicle 102, one or more vehicle response measures may be initiated at block 310. In example embodiments in which the vehicle 102 is an AV, the one or more vehicle response measures may include, without limitation, raising an alertness level of the AV, performing an automated braking operation, performing an automated lane changing operation, modifying a navigation route being traversed by the vehicle, and so forth.

In some example embodiments, the first vehicle response measure to be initiated may be to raise the alertness level of the vehicle 102. The raised alertness level may trigger the analysis of additional sensor data to determine whether a further vehicle response measure should be initiated. For instance, image data captured by one or more on-board cameras may be analyzed to determine a navigation path being taken by the authority vehicle 200. In example embodiments, if the image data indicates that the authority vehicle 200 is approaching the vehicle 102 from behind a direction of movement/travel of the vehicle 102 and within a same travel lane as the vehicle 102, an automated lane changing operation may be initiated, and optionally, an automated braking operation may be initiated to decrease a speed of the vehicle 102 or bring the vehicle 102 to a complete stop. In other example embodiments, if the image data indicates that the authority vehicle is approaching the vehicle 102 from behind a direction of movement/travel of the vehicle 102 but in a different travel lane than the vehicle 102, an automated braking operation to decrease a speed of the vehicle 102 or bring the vehicle 102 to a complete stop may be initiated but a lane changing operation may not be necessary.

While not depicted in FIG. 2A, in other example embodiments, the image data may indicate that the authority vehicle 200 is approaching the vehicle 102 from in front of a direction of movement/travel of the vehicle 102. In such an example scenario, a vehicle response measure may or may not be necessary depending on, for example, the particular travel paths being taken by the authority vehicle 200 and the vehicle 102 and the corresponding map layout. For example, if the authority vehicle 200 is approaching the vehicle 102 in the opposing direction on a road surface that includes a barrier between the opposing directions of traffic, and the vehicle 102 will not encounter any road intersection via which the authority vehicle 200 may be able to turn into or otherwise cross the travel path of the vehicle 102, then no vehicle response measure may be necessary, other than perhaps, the initial raising of the alertness level of the vehicle 102, after which other forms of sensor data such as image data are analyzed to determine that the authority vehicle 200 is approaching the vehicle 102 from in front of the vehicle 102. Rather, the vehicle 102 may be allowed to continue along its travel path without any deviation in navigation, speed, acceleration, or the like necessitated by the presence of the authority vehicle 200. In contrast, as another non-limiting example, if the authority vehicle 200 is approaching the vehicle 102 in the opposing direction on a road surface that does not include a barrier between the opposing directions of traffic, or if the vehicle 102 will encounter a road intersection via which the authority vehicle 200 may be able to turn into or otherwise cross the travel path of the vehicle, then one or more vehicle response measures may be initiated beyond the initial raising of the alertness level of the vehicle 102 including, without limitation, an automated braking operation, an automated lane changing operation, a modification to a navigation route being followed by the vehicle 102, or the like.

In some example embodiments, a vehicle response measure such as an automated braking operation is automatically initiated responsive to determining that the authority vehicle 200 is approaching the vehicle 102 from behind the vehicle 102. In other example embodiments, a vehicle response measure such as raising a vehicle alertness level is first initiated responsive to determining that the authority vehicle 200 is approaching the vehicle 102 from behind the vehicle 102. Then, after the vehicle alertness level is raised, additional sensor data (e.g., LiDAR data, image data, radar data, etc.) may be analyzed to determine a travel path of the authority vehicle 200 in relation to a travel path of the vehicle 102, and thus, any additional vehicle response measures to be taken such as an automated lane changing operation, a vehicle navigation route modification, or the like. In some example embodiments, the vehicle alertness level may be increased responsive to determining that the authority vehicle 200 is travelling towards the vehicle 102 from in front of the vehicle 102, prior to any other vehicle response measures being taken.

Continuing with the description of the example method 300, from block 310, the method 300 may proceed again from block 302 as additional acoustic signals are received the audio capture devices 104. In response to a negative determination at block 308, the engine 116 may determine, at block 312, whether the detected frequency of the acoustic signal received at block 302 is less than the expected frequency. For instance, if the acoustic signal 208 is received at block 302, then the engine 116 would determine that the detected frequency 212 is less than the expected frequency (e.g., the emitted frequency of the acoustic signal 208 when the authority vehicle 200 is at location 206) because the authority vehicle 200 is moving away from the vehicle 102 (i.e., receding from the vehicle 102). In response to such a positive determination at block 312, no vehicle response measure may be initiated, or in the alternative, a vehicle response measure previously initiated may be ceased. For instance, if the vehicle 102 was automatically brought to a stop at a location outside of a travel path of the authority vehicle 200 as a vehicle response measure taken in response to a positive determination at block 308, then the vehicle 102 may be controlled to once again resume its navigation path in response to determining that the authority vehicle 200 has passed the vehicle 102 is now moving away from the vehicle 102. From block 314, the method 300 may proceed again from block 302 as additional acoustic signals are received the audio capture devices 104.

Further, in response to a negative determination at block 312, the method 300 may again proceed from block 302. In some example embodiments, a negative determination at block 308 followed by a negative determination at block 312 may indicate that the authority vehicle 102 is travelling at the same velocity as the vehicle 102 (e.g., at the same speed and in the same direction). In other example embodiments, a negative determination at block 308 followed by a negative determination at block 312 may occur at a moment when the authority vehicle 200 and the vehicle 102 are passing by one another in directly opposed directions of travel.

Figure 2B:
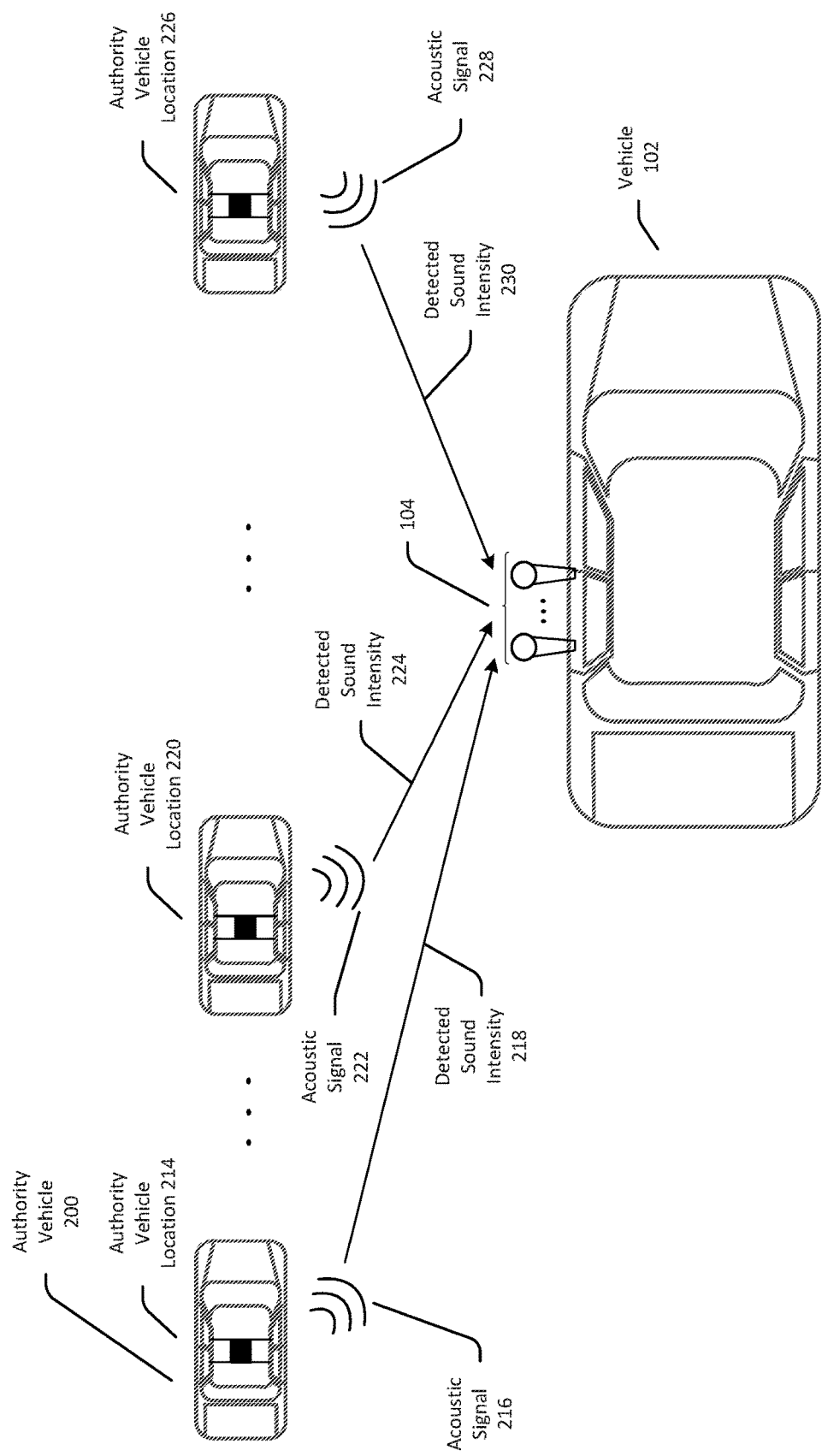
FIG. 2B schematically illustrates automated determination of a direction of movement of an authority vehicle in relation to a vehicle based on a sound intensity of acoustic signals emitted from a signal source associated with the authority vehicle and received at one or more audio capture devices associated with the vehicle in accordance with an example embodiment of the invention.
Figure 4:
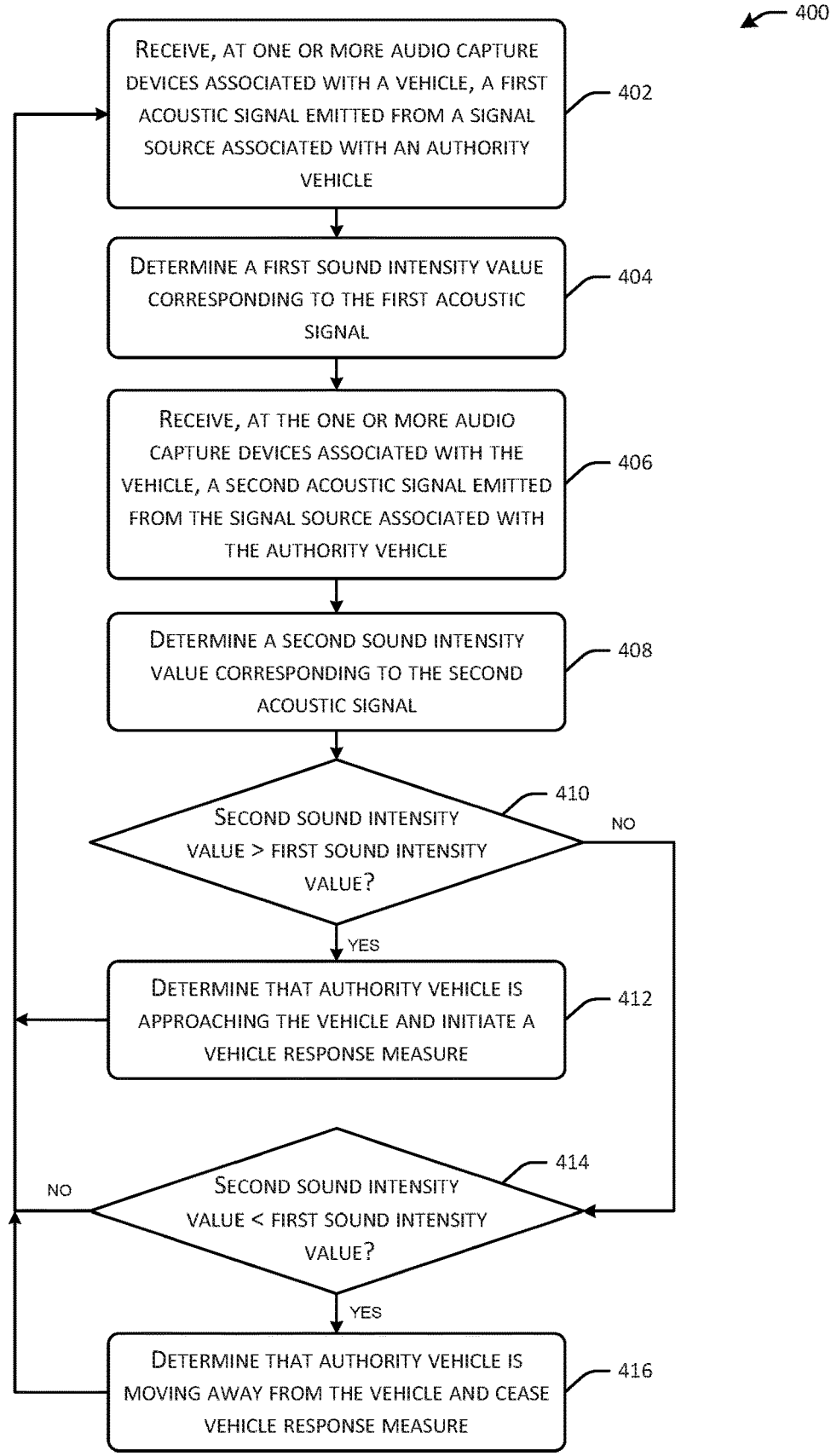
FIG. 4 is a process flow diagram of an illustrative method for automated determination of a direction of movement of an authority vehicle in relation to a vehicle based on a sound intensity characteristic of acoustic signals emitted from a signal source associated with the authority vehicle in accordance with an example embodiment of the invention.

In some example embodiments, signal characteristics other than frequency may be used to determine a direction of movement/travel of the authority vehicle 200 in relation to the vehicle 102. FIG. 2B schematically illustrates automated determination of a direction of movement of an authority vehicle in relation to a vehicle based on a sound intensity of acoustic signals emitted from a signal source associated with the authority vehicle and received at one or more audio capture devices associated with the vehicle in accordance with an example embodiment of the invention. FIG. 4 is a process flow diagram of an illustrative method 400 for automated determination of a direction of movement of an authority vehicle in relation to a vehicle based on a sound intensity characteristic of acoustic signals emitted from a signal source associated with the authority vehicle in accordance with an example embodiment of the invention. FIG. 4 will be described in reference to FIGS. 1 and 2B hereinafter.

Referring now to FIG. 4 in reference to FIGS. 1 and 2B, at block 402 of the method 400, a first acoustic signal emitted from a signal source associated with the authority vehicle 200 may be received at the audio capture devices 104. Then, at block 404 of the method 400, the acoustic signal sound intensity detection engine 112 may determine a first sound intensity value corresponding the first acoustic signal. In some example embodiments, a decibel meter or the like may be provided at an exterior and/or an interior of the vehicle 102. The decibel meter may, for example, be configured to determine a sound intensity value for an acoustic signal detected at an audio capture device 104 by measuring the sound pressure of the acoustic signal. The decibel meter may be integrated with the engine 112 or otherwise communicatively coupled to the engine 112.

At block 406 of the method 400, a second acoustic signal emitted from the signal source associated with the authority vehicle 200 may be received at the audio capture devices 104, and at block 408 of the method 400, the engine 112 may determine a second sound intensity value for the second acoustic signal. In example embodiments, the second acoustic signal may be received at a second time period that is at least partially after a first time period at which the first acoustic signal is received. Then, at block 410 of the method 400, the engine 116 may receive the first and second sound intensity values as input ands may determine whether the second sound intensity value is greater than the first sound intensity value.

As a non-limiting example, assume that the first acoustic signal received at block 402 is an acoustic signal 216 emitted from the authority vehicle 200 when it is at location 214 in relation to the vehicle 102. The location 214 may be a location at which the authority vehicle 200 is behind the vehicle 102. It should be appreciated that an acoustic signal being emitted from a source when a vehicle is at a particular location, as described herein, means that at least a portion of the acoustic signal is emitted while the vehicle is at or passing through the particular location. Further, assume that the second acoustic signal received at block 406 is the acoustic signal 222 emitted from the authority vehicle 200 when it is at location 220 in relation to the vehicle 102. The location 220 may be a location at which the authority vehicle 200 is still behind the vehicle 102 but at a closer distance to the vehicle 102 than it was at location 214, indicating that the authority vehicle 200 is approaching the vehicle 102 from behind.

As previously noted, in example embodiments, the engine 112 may determine a first sound intensity value 218 for the first acoustic signal 216 and a second sound intensity value 224 for the second acoustic signal 222. Then, at block 410, the engine 116 may determine that the second sound intensity value 224 is greater than the first sound intensity value 218. Presumably, in example embodiments, as the authority vehicle 200 approaches the vehicle 102, the sound intensity (e.g., the sound pressure) of an acoustic signal emitted from the authority vehicle 200 and detected at the vehicle 102 increases. Accordingly, based on the positive determination at block 410 that the second sound intensity value 224 is greater than the first sound intensity value 218, and the fact that the second acoustic signal 222 was received at the audio capture devices 104 at least partially after receipt of the first acoustic signal 216, the engine 116 may determine that the second acoustic signal 222 was emitted from an authority vehicle location 222 that is a closer distance to the vehicle 102 than a distance between the vehicle 102 and the authority vehicle 200 when the authority vehicle 200 was at location 214 from which the first acoustic signal 216 was emitted, and thus, may determine, at block 412, that the authority vehicle 200 is approaching the vehicle 102.

Responsive to determining that the authority vehicle 200 is approaching the vehicle 102, one or more vehicle response measures may be initiated at block 412. Then, from block 412, the method 400 may proceed again to block 402 as additional acoustic signals are received at the audio capture devices 104. Any of the vehicle response measures as well as any of the mechanisms or conditions for determining whether to initiate a vehicle response measure, which vehicle response measure to initiate, and/or an order in which to initiate vehicle response measures, as those previously described herein, can be employed at block 412. In addition, it should be appreciated that while the authority vehicle location 214 has been assumed to be behind a direction of movement/travel of the vehicle 102, in other example embodiments, the authority vehicle location 214 may be in front of a direction of movement/travel of the vehicle 102. Further, the authority vehicle location 222 may also be in front of a direction of movement/travel of the vehicle 102 but at a closer distance to the vehicle 102. As such, each of the authority vehicle locations 214, 222 can represent locations of the authority vehicle 200 relative to the vehicle 102 that are in front of a direction of movement/travel of the vehicle 102 in scenarios in which the authority vehicle 200 is approaching the vehicle 102 from an at least partially opposing direction. In such example scenarios, the detected sound intensity 224 of the second acoustic signal 222 would be greater than the detected sound intensity 218 of the first acoustic signal 216—similar to scenarios in which the locations 214, 220 corresponding to authority vehicle locations behind the vehicle 102.

Continuing with the description of the example method 400, in response to a negative determination at block 410, the method 400 may proceed to block 414, where the engine 116 may determine whether second sound intensity value is less than the first sound intensity value. As a non-limiting example, assume that the acoustic signal 222 emitted when the authority vehicle 200 is at location 220 is the first acoustic signal received at block 402. Further assume that the acoustic signal 228 emitted when the authority vehicle 200 is at location 226 is the second acoustic signal received at block 406. In example embodiments, the location 220 may be a location at which the authority vehicle 200 is behind the vehicle 102, a location at which the authority vehicle 200 is at least partially perpendicular to the vehicle 102, or a location that is front of the vehicle 102. Further, in example embodiments, the location 226 may be a subsequent location that the authority vehicle 200 is at after the location 220, where the distance between the vehicle 102 and the authority vehicle 200 when the authority vehicle is at location 226 is greater than the distance from the vehicle 102 and the authority vehicle 200 when the authority vehicle 200 is at location 214.

In some example embodiments, authority vehicle locations 220, 226 may correspond to locations where authority vehicle 200 is traveling in a non-opposing direction as the vehicle 102 (i.e., there are components of the direction of travel of the authority vehicle 200 and the direction of travel of the vehicle 102 are parallel). In other example embodiments, authority vehicle locations 220, 226 may correspond to locations where authority vehicle 200 is traveling in an at least partially opposing direction as the vehicle 102 (i.e., there are components of the direction of travel of the authority vehicle 200 and the direction of travel of the vehicle 102 that directly oppose one another).

Continuing with the non-limiting example introduced above, the engine 112 may determine a first sound intensity value 224 for the first acoustic signal 222 and a second sound intensity value 230 for the second acoustic signal 228. Then, at block 414, the engine 116 may determine that the second sound intensity value 230 is less than the first sound intensity value 224. Presumably, in example embodiments, as the authority vehicle 200 moves away from the vehicle 102, the sound intensity (e.g., the sound pressure) of an acoustic signal emitted from the authority vehicle 200 and detected at the vehicle 102 decreases. Accordingly, based on the positive determination at block 414 that the second sound intensity value 230 is less than the first sound intensity value 224, and the fact that the second acoustic signal 228 was received at the audio capture devices 104 at least partially after receipt of the first acoustic signal 222, the engine 116 may determine that the second acoustic signal 228 was emitted from an authority vehicle location 226 that is a farther distance to the vehicle 102 than a distance between the vehicle 102 and the authority vehicle 200 when the authority vehicle 200 was at location 220 from which the first acoustic signal 222 was emitted, and thus, may determine, at block 414, that the authority vehicle 200 is moving away from the vehicle 102.

Responsive to determining that the authority vehicle 200 is moving away from the vehicle 102, one or more vehicle response measures that may have been previously initiated at block 412 may be ceased at block 416. For instance, the vehicle 102 may again be controlled to resume its navigation route if a previously vehicle response measure had been taken to reduce the vehicle's speed or bring the vehicle to a stop in response to an approaching authority vehicle. If there are no pending vehicle response measures, it may simply be the case that no vehicle response measure is taken at block 416. Then, from block 416, the method 400 may proceed again to block 402 as additional acoustic signals are received at the audio capture devices 104.

In some example embodiments, as an alternative to or in addition to image data, signal characteristics of an acoustic signal emitted from the authority vehicle 200 can be analyzed to determine a location of the authority vehicle 200 in relation to the vehicle 102. For instance, the phase of an acoustic signal, or more specifically, the relative phase difference between an acoustic signal received at different audio capture devices 104 of the vehicle 102 can be used to echo-locate the authority vehicle 200 in relation to the vehicle 102.

Figure 2C:
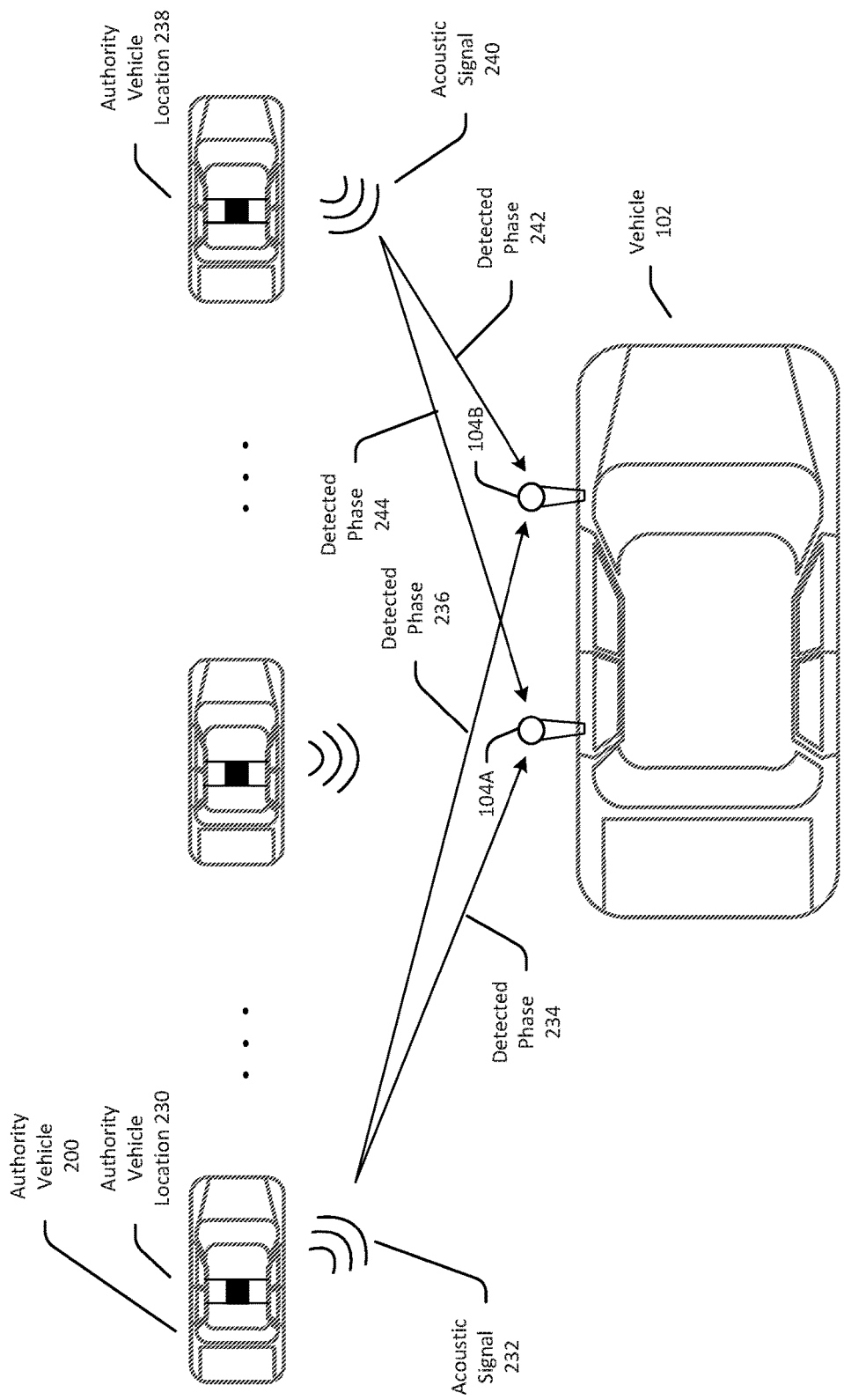
FIG. 2C schematically illustrates automated determination of a location of an authority vehicle in relation to a vehicle based on a relative phase difference of acoustic signals emitted from a signal source associated with the authority vehicle and received at multiple audio capture devices associated with the vehicle in accordance with an example embodiment of the invention.
Figure 5:
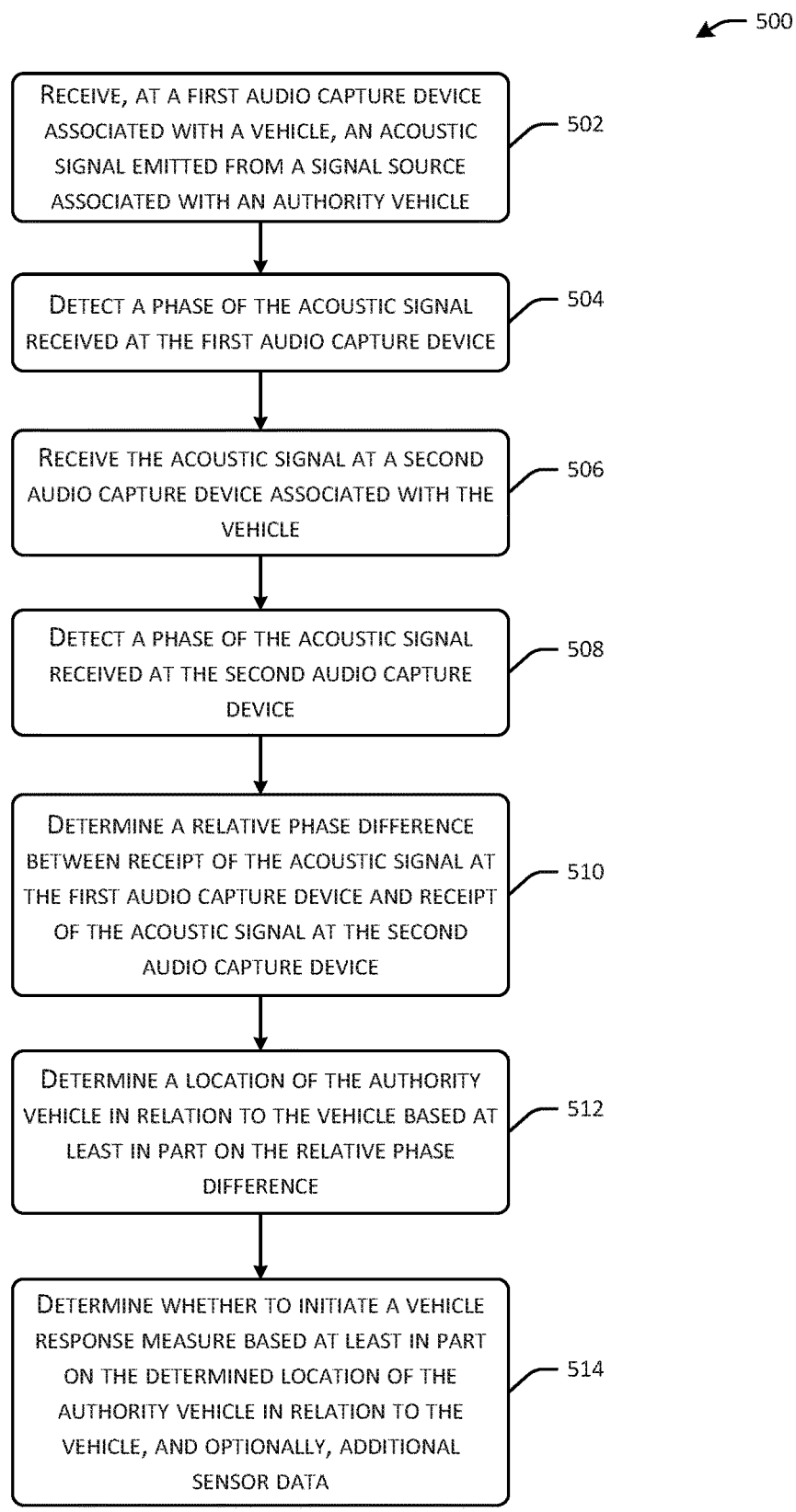
FIG. 5 is a process flow diagram of an illustrative method for automated determination of a location of an authority vehicle in relation to a vehicle based on a phase characteristic of acoustic signals emitted from a signal source associated with the authority vehicle in accordance with an example embodiment of the invention.

FIG. 2C schematically illustrates automated determination of a location of an authority vehicle in relation to a vehicle based on a relative phase difference of acoustic signals emitted from a signal source associated with the authority vehicle and received at multiple audio capture devices associated with the vehicle in accordance with an example embodiment of the invention. FIG. 5 is a process flow diagram of an illustrative method 500 for automated determination of a location of an authority vehicle in relation to a vehicle based on a phase characteristic of acoustic signals emitted from a signal source associated with the authority vehicle in accordance with an example embodiment of the invention. FIG. 5 will be described in reference to FIGS. 1 and 2C.

Referring now to FIG. 5 in reference to FIGS. 1 and 2C, at block 502 of the method 500, an acoustic signal 232 emitted from the authority vehicle 200 when the authority vehicle is at location 230 may be received at a first audio capture device 104A of the vehicle 102. At block 504 of the method 500, the acoustic signal phase detection engine 114 may detect a first phase 234 of the acoustic signal 232 received at the first audio capture device 104A. Similarly, at block 506 of the method 500, the acoustic signal 232 may be received at a second audio capture device 104B of the vehicle 102. At block 608 of the method 500, the acoustic signal phase detection engine 114 may detect a second phase 236 of the acoustic signal 232 received at the second audio capture device 104B.

At block 510 of the method 500, the engine 114 may determine a relative phase difference between the first detected phase 234 of the acoustic signal 232 received at the first audio capture device 104A and the second detected phase 236 of the acoustic signal 232 received at the second audio capture device 104B. Then, at block 512 of the method 500, the authority vehicle relative location determination engine 118 may determine a location of the authority vehicle 200 in relation to the vehicle 102 based at least in part on the relative phase difference between the first detected phase 234 and the second detected phase 236.

More specifically, in example embodiments, the engine 118 may determine a difference in time of receipt of the acoustic signal 232 at the first audio capture device 104A and time of receipt of the acoustic signal 232 at the second audio capture device 104B based at least in part on the relative phase difference. A location of the authority vehicle 200 in relation to the vehicle 102 can then be determined based on the difference in time of receipt of the acoustic signal 232 at the first audio capture device 104A and time of receipt of the acoustic signal 232 at the second audio capture device 104B. For instance, if the relative phase difference indicates that the acoustic signal 232 is first received at the audio capture device 104A and then later received at the audio capture device 104B, and the audio capture device 104A is known to be located closer to the rear of the vehicle 102 than the audio capture device 104B, the authority vehicle 200 may be determined to be at a location 230 that is behind the vehicle 102 (assuming the vehicle 102 is traveling in a forward direction).

On the other hand, when considering the acoustic signal 240 emitted from the authority vehicle 200 when the authority vehicle 200 is at location 238, if the relative phase difference between the detected phase 242 of the acoustic signal 240 received at audio capture device 104B and the detected phase 244 of the acoustic signal 240 received at the audio capture device 104A indicates that the acoustic signal 240 is first received at the audio capture device 104B and then later received at the audio capture device 104A, and it is known that the audio capture device 104B is located closer to the front of the vehicle 102 than the audio capture device 104A, then the authority vehicle 200 may be determined to be at a location 238 that is in front of the vehicle 102 (assuming the vehicle 102 is travelling in a forward direction). It should be appreciated that regardless of whether authority vehicle 200 is determined to be at a location behind the vehicle 102 or at a location in front of the vehicle 102, the authority vehicle 200 may be approaching the vehicle 102 or moving away from the vehicle.

At block 514 of the method 500, a determination may be made as to whether to initiate a vehicle response measure based on the determined location of the authority vehicle 200 in relation to the vehicle 102, and optionally, additional sensor data. In some embodiments, a vehicle response measure may not be initiated if the authority vehicle 200 is moving away from the vehicle 102 regardless of whether the authority vehicle 200 is located in front of or behind the vehicle 102. In some example embodiments, if the authority vehicle 200 is determined to be moving towards the vehicle 102, the location of the authority vehicle 200 in relation to the vehicle 102 may impact whether a vehicle response measure (other than raising a vehicle alertness level) is automatically initiated, or in the alternative, whether the vehicle alertness level is first raised and additional sensor data (e.g., image data) is used to determine whether additional vehicle response measures should be initiated and/or which additional measures to be taken. For instance, in some example embodiments, if the authority vehicle 200 is moving towards the vehicle 102 from behind the vehicle (e.g., location 230), a vehicle response measure (other than raising a vehicle alertness level) may be automatically initiated (e.g., an automated braking operation). In other example embodiments, if the authority vehicle 200 is moving towards the vehicle 102 from in front of the vehicle, the vehicle alertness level may first be raised, and then additional sensor data (e.g., image data) may be analyzed to determine whether any additional vehicle response measures should be taken.

In some example embodiments, signal characteristic(s) of an acoustic signal emitted from a signal source associated with the authority vehicle 200 can be analyzed to determine not only a direction of movement of the authority vehicle 200 or a location of the authority vehicle 200 in relation to the vehicle 102, but also a speed of the authority vehicle 200. For instance, in some example embodiments, a relationship between a detected frequency of an acoustic signal, an expected frequency of the acoustic signal, and a velocity of the vehicle 102 can be used to determine a speed of the authority vehicle 200 based, for example, on the Doppler effect, as previously described. Once determined, the speed of the authority vehicle 200 can be assessed, along with other factors such as the location of the authority vehicle 200 in relation to the vehicle 102, to determine which vehicle response measure(s) to take and/or what parameters to select for the vehicle response measure(s). For instance, the speed of the authority vehicle 200 can be used to determine how quickly to decelerate the vehicle 102 as part of an automated braking operation.

Figure 6:
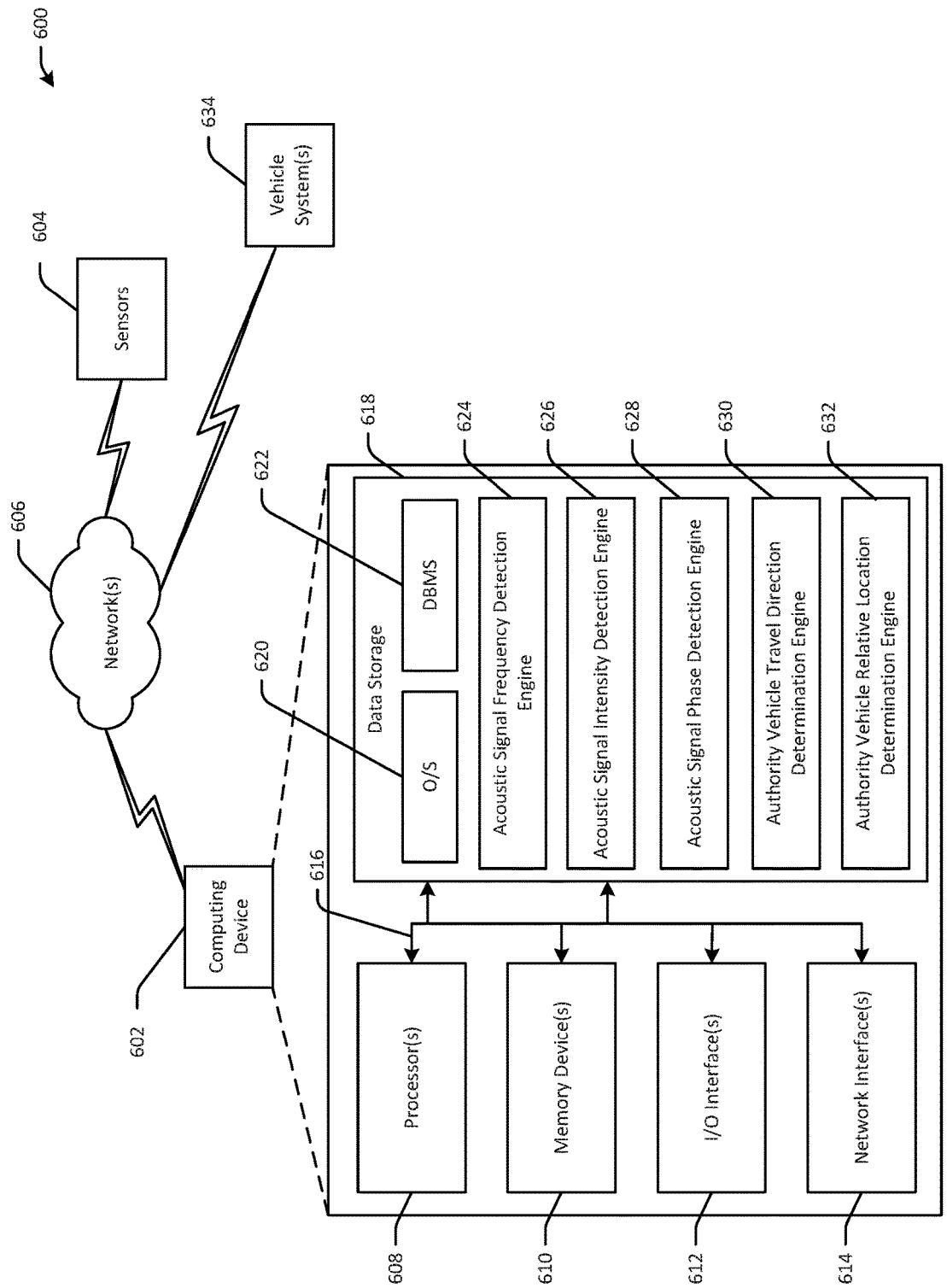
FIG. 6 is a schematic block diagram illustrating an example networked architecture configured to implement example embodiments of the invention.

Each operation of any of the methods 300-500 can be performed by one or more of the engines or the like depicted in FIG. 1 or 6. These engines can be implemented in any combination of hardware, software, and/or firmware. In certain example embodiments, one or more of these engines can be implemented, at least in part, as software and/or firmware modules that include computer-executable instructions that when executed by a processing circuit cause one or more operations to be performed. In example embodiments, these engines may be customized computer-executable logic implemented within a customized computing chip such as an FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Hardware Implementation

FIG. 6 is a schematic block diagram illustrating an example networked architecture 600 configured to implement example embodiments of the invention. The networked architecture 600 can include one or more special-purpose computing devices 602 communicatively coupled via one or more networks 606 to various sensors 604. In example embodiments, the computing device(s) 602 may include the ECU 108 depicted in FIG. 1 or may be otherwise communicatively coupled thereto. The sensors 604 may include any of the example types of on-board vehicle sensors previously described including, without limitation, LiDAR sensors, radars, cameras, GPS receivers, sonar-based sensors, IMUs, accelerometers, gyroscopes, magnetometers, FIR sensors, and so forth. In example embodiments, the sensors 604 may include any of the types of audio capture devices 104 previously described including microphones, ultrasonic sensors, or the like. The special-purpose computing device(s) 602 may include devices that are integrated with a vehicle and may receive sensor data from the sensors 504 via a local network connection (e.g., WiFi, Bluetooth, Dedicated Short Range Communication (DSRC), or the like). In other example embodiments, the special-purpose computing device(s) 602 may be provided remotely from a vehicle and may receive the sensor data from the sensors 604 via one or more long-range networks. In addition, the computing device(s) 602 may be communicatively coupled to one or more vehicle systems 634 via the network(s) 606. The vehicle system(s) 634 may include an in-vehicle infotainment system, other mechanical and/or electrical systems of a vehicle, and so forth.

The special-purpose computing device(s) 602 may be hard-wired to perform the techniques described herein; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 602 may also combine custom hard-wired logic, ASICs, or FPGAs with custom programming to accomplish the techniques. The special-purpose computing device(s) 602 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 620, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device(s) 602 may be controlled by a proprietary operating system. The operating system software 620 may control and schedule computer processes for execution; perform memory management; provide file system, networking, and I/O services; and provide user interface functionality, such as a graphical user interface ("GUI").

While the computing device(s) 602, the sensors 604, and/or the vehicle system(s) 634 may be described herein in the singular, it should be appreciated that multiple instances of any such component can be provided and functionality described in connection any particular component can be distributed across multiple instances of such a component. In certain example embodiments, functionality described herein in connection with any given component of the architecture 600 can be distributed among multiple components of the architecture 600. For example, at least a portion of functionality described as being provided by a computing device 602 may be distributed among multiple such computing devices 602.

The network(s) 606 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 606 can have any suitable communication range associated therewith and can include, for example, global networks (e.g., the Internet), metropolitan area networks (MANs), wide area networks (WANs), local area networks (LANs), or personal area networks (PANs). In addition, the network(s) 606 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 602 can include one or more processors (processor(s)) 608, one or more memory devices 610 (generically referred to herein as memory 610), one or more input/output ("I/O") interface(s) 612, one or more network interfaces 614, and data storage 618. The computing device 602 can further include one or more buses 616 that functionally couple various components of the computing device 602. The computing device 602 may also include various engines including an acoustic signal frequency detection engine 624, an acoustic signal intensity detection engine 626, an acoustic signal phase detection engine 628, an authority vehicle travel direction determination engine 630, and an authority vehicle relative location determination engine 632. These engines may be implemented in any combination of software, hardware, or firmware. While these engines are illustratively depicted as software/firmware modules stored in the data storage 618, it should be appreciated that the engines may include hard-wired logic, customized logic of a persistently programmed customized computing device such as an ASIC or FPGA, or the like. Each of the engines may include logic for performing any of the processes and tasks described earlier in connection with correspondingly named engines depicted in FIG. 1.

The bus(es) 616 can include at least one of a system bus, a memory bus, an address bus, or a message bus, and can permit the exchange of information (e.g., data (including computer-executable code), signaling, etc.) between various components of the computing device 602. The bus(es) 616 can include, without limitation, a memory bus or a memory controller, a peripheral bus, an accelerated graphics port, and so forth. The bus(es) 616 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 610 can include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 610 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The data storage 618 can include removable storage and/or non-removable storage including, but not limited to, magnetic storage, optical disk storage, and/or tape storage. The data storage 618 can provide non-volatile storage of computer-executable instructions and other data. The memory 610 and the data storage 618, removable and/or non-removable, are examples of computer-readable storage media (CRSM) as that term is used herein. The data storage 618 can store computer-executable code, instructions, or the like that can be loadable into the memory 610 and executable by the processor(s) 608 to cause the processor(s) 608 to perform or initiate various operations. The data storage 618 can additionally store data that can be copied to memory 610 for use by the processor(s) 608 during the execution of the computer-executable instructions. Moreover, output data generated as a result of execution of the computer-executable instructions by the processor(s) 608 can be stored initially in memory 610 and can ultimately be copied to data storage 618 for non-volatile storage.

More specifically, the data storage 618 can store one or more operating systems (O/S) 620 and one or more database management systems (DBMS) 622 configured to access the memory 610 and/or one or more external datastore(s) potentially via one or more of the networks 606. In addition, the data storage 618 may further store one or more program modules, applications, engines, computer-executable code, scripts, or the like. For instance, any of the engines described herein may be implemented as software and/or firmware that includes computer-executable instructions (e.g., computer-executable program code) loadable into the memory 610 for execution by one or more of the processor(s) 608 to perform any of the techniques described herein.

Although not depicted in FIG. 6, the data storage 618 can further store various types of data utilized by engines of the computing device 602. Such data may include, without limitation, sensor data, map data, signal characteristic data, location data, or the like. Any data stored in the data storage 618 can be loaded into the memory 610 for use by the processor(s) 608 in executing computer-executable program code. In addition, any data stored in the data storage 618 can potentially be stored in one or more external datastores that are accessible via the DBMS 622 and loadable into the memory 610 for use by the processor(s) 608 in executing computer-executable instructions/program code.

The processor(s) 608 can be configured to access the memory 610 and execute computer-executable instructions/ program code loaded therein. For example, the processor(s) 608 can be configured to execute computer-executable instructions/program code of the various program modules to cause or facilitate various operations to be performed in accordance with one or more embodiments of the invention. The processor(s) 608 can include any suitable processing unit capable of accepting data as input, processing the input data in accordance with stored computer-executable instructions, and generating output data. The processor(s) 608 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 can be made capable of supporting any of a variety of instruction sets.

Referring now to other illustrative components depicted as being stored in the data storage 618, the O/S 620 can be loaded from the data storage 618 into the memory 610 and can provide an interface between other application software executing on the computing device 602 and hardware resources of the computing device 602. More specifically, the O/S 620 can include a set of computer-executable instructions for managing hardware resources of the computing device 602 and for providing common services to other application programs. In certain example embodiments, the O/S 620 can include or otherwise control execution of one or more of the program modules stored in the data storage 618. The O/S 620 can include any operating system now known or which can be developed in the future including, but not limited to, any server operating system, any mainframe operating system, or any other proprietary or non-proprietary operating system.

The DBMS 622 can be loaded into the memory 610 and can support functionality for accessing, retrieving, storing, and/or manipulating data stored in the memory 610, data stored in the data storage 618, and/or data stored in external datastore(s). The DBMS 622 can use any of a variety of database models (e.g., relational model, object model, etc.) and can support any of a variety of query languages. The DBMS 622 can access data represented in one or more data schemas and stored in any suitable data repository. Datastore(s) that may be accessible by the computing device 602 via the DBMS 622, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 602, the input/output (I/O) interface(s) 612 can facilitate the receipt of input information by the computing device 602 from one or more I/O devices as well as the output of information from the computing device 602 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 602 or can be separate therefrom. The I/O devices can further include, for example, any number of peripheral devices such as data storage devices, printing devices, and so forth.

The I/O interface(s) 612 can also include an interface for an external peripheral device connection such as universal serial bus (USB), FireWire, Thunderbolt, Ethernet port or other connection protocol that can connect to one or more networks. The I/O interface(s) 612 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 602 can further include one or more network interfaces 614 via which the computing device 602 can communicate with any of a variety of other systems, platforms, networks, devices, and so forth. The network interface(s) 614 can enable communication, for example, with the sensors 504 and/or one or more other devices via one or more of the network(s) 606. In example embodiments, the network interface(s) 614 provide a two-way data communication coupling to one or more network links that are connected to one or more of the network(s) 606. For example, the network interface(s) 614 may include an integrated services digital network (ISDN) card, a cable modem, a satellite modem, or a modem to provide a data communication connection to a corresponding type of telephone line. As another non-limiting example, the network interface(s) 614 may include a local area network (LAN) card to provide a data communication connection to a compatible LAN (or a wide area network (WAN) component to communicate with a WAN). Wireless links may also be implemented. In any such implementation, the network interface(s) 614 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 504 and the signals on network links and through the network interface(s) 614, which carry the digital data to and from the computing device 602, are example forms of transmission media. In example embodiments, the computing device 602 can send messages and receive data, including program code, through the network(s) 606, network links, and network interface(s) 614. For instance, in the Internet example, a server might transmit a requested code for an application program through the Internet, the ISP, a local network, and a network interface 614. The received code may be executed by a processor 608 as it is received, and/or stored in the data storage 618, or other non-volatile storage for later execution.

It should be appreciated that the engines depicted in FIG. 6 as part of the computing device 602 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 602 and/or hosted on other computing device(s) (e.g., 602) accessible via one or more of the network(s) 602, can be provided to support functionality provided by the engines depicted in FIG. 6 and/or additional or alternate functionality. In addition, engines that support functionality described herein can be implemented, at least partially, in hardware and/or firmware and can be executable across any number of computing devices 602 in accordance with any suitable computing model such as, for example, a client-server model, a peer-to-peer model, and so forth.

It should further be appreciated that the computing device 602 can include alternate and/or additional hardware, software, and/or firmware components beyond those described or depicted without departing from the scope of the invention. More particularly, it should be appreciated that software, firmware, and/or hardware components depicted as forming part of the computing device 602 are merely illustrative and that some components may or may not be present or additional components may be provided in various embodiments. It should further be appreciated that each of the engines depicted and described represent, in various embodiments, a logical partitioning of supported functionality. This logical partitioning is depicted for ease of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 602. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for determining a direction of movement of an authority vehicle in relation to a vehicle, comprising:
   receiving, at one or more audio capture devices associated with the vehicle, an acoustic signal emitted from a signal source associated with the authority vehicle;
   determining one or more signal characteristics of the acoustic signal, the determining comprising comparing a frequency of the acoustic signal against an expected frequency;
   determining, based on the comparison, whether the authority vehicle is moving towards the vehicle;
   in response to determining that the authority vehicle is moving towards the vehicle, increasing an amount of Lidar data, image data, and radar data to be analyzed;
   based on the analysis of the Lidar data, the image data, and the radar data, determining whether the authority vehicle is moving from an opposite direction relative to the vehicle;
   in response to determining that the authority vehicle is moving from an opposite direction, determining whether a barrier prevents the authority vehicle from crossing a travel path of the vehicle;
   determining whether to initiate a vehicle response measure based at least in part on the location of the authority vehicle in relation to the vehicle, and whether a barrier prevents the authority vehicle from crossing a travel path of the vehicle; and
   selectively initiating the vehicle response measure, the selective initiating comprising:
      refraining from initiating a vehicle response measure in response to determining that a barrier prevents the authority vehicle from crossing a travel path of the vehicle; and
      initiating a vehicle response measure in response to determining:
         an absence of a barrier; or
         a gap, in a barrier, between the vehicle and the authority vehicle through which the authority vehicle potentially traverses.

2. The computer-implemented method of claim 1, wherein determining the one or more signal characteristics of the acoustic signal comprises determining the frequency of the acoustic signal, and wherein determining of whether the authority vehicle is moving towards the vehicle comprises:
   determining the expected frequency of the acoustic signal;
   determining that the frequency of the acoustic signal is greater than the expected frequency of the acoustic signal; and
   determining that the authority vehicle is moving towards the vehicle responsive at least in part to determining that the frequency of the acoustic signal is greater than the expected frequency of the acoustic signal.

3. The computer-implemented method of claim 1, wherein determining the one or more signal characteristics of the acoustic signal comprises determining the frequency of the acoustic signal, and wherein determining of whether the authority vehicle is moving towards the vehicle comprises:
   determining the expected frequency of the acoustic signal;
   determining that the frequency of the acoustic signal is less than the expected frequency of the acoustic signal; and
   determining that the authority vehicle is moving away from the vehicle responsive at least in part to determining that the frequency of the acoustic signal is less than the expected frequency of the acoustic signal.

4. The computer-implemented method of claim 1, wherein the acoustic signal is a first acoustic signal, and wherein determining the one or more signal characteristics of the first acoustic signal comprises determining a sound intensity of the first acoustic signal, the method further comprising:
   receiving, at the one or more audio capture devices, a second acoustic signal emitted from the signal source associated with the authority vehicle, wherein the first acoustic signal is emitted, at least in part, when the authority vehicle is at a first location at a first time period and the second acoustic signal is emitted, at least in part, when the authority vehicle is at a second location different from the first location at a second time period after the first time period; and
   determining a sound intensity of the second acoustic signal.

5. The computer-implemented method of claim 4, wherein determining of whether the authority vehicle is moving towards the vehicle comprises:
   determining that the sound intensity of the second acoustic signal is greater than the sound intensity of the first acoustic signal; and
   determining that the authority vehicle is moving towards the vehicle responsive at least in part to determining that the sound intensity of the second acoustic signal is greater than the sound intensity of the first acoustic signal.

6. The computer-implemented method of claim 4, wherein determining of whether the authority vehicle is moving towards the vehicle comprises:
   determining that the sound intensity of the second acoustic signal is less than the sound intensity of the first acoustic signal; and
   determining that the authority vehicle is moving away from the vehicle responsive at least in part to determining that the sound intensity of the second acoustic signal is less than the sound intensity of the first acoustic signal.

7. The computer-implemented method of claim 1, wherein determining of whether the authority vehicle is moving towards the vehicle comprises determining that the authority vehicle is moving towards the vehicle, the initiating of a vehicle response measure comprising at least one of a heightened alertness level of the vehicle, an automated braking operation, an automated lane changing operation, and an automated navigation route modification.

8. The computer-implemented method of claim 7, wherein determining of whether the authority vehicle is moving towards the vehicle comprises determining that the authority vehicle is moving away from the vehicle, the method further comprising ceasing the vehicle response measure.

9. The computer-implemented method of claim 1, wherein respective travel paths of the vehicle and the authority vehicle are parallel.

10. A system for determining a direction of movement of an authority vehicle in relation to a vehicle, comprising:
at least one processor; and
at least one memory storing computer-executable instructions, wherein the at least one processor is configured to access the at least one processor and execute the computer-executable instructions to:
receive, at one or more audio capture devices associated with the vehicle, an acoustic signal emitted from a signal source associated with the authority vehicle;
determine one or more signal characteristics of the acoustic signal, the determining comprising comparing a frequency of the acoustic signal against an expected frequency;
determine, based on the comparison, whether the authority vehicle is moving towards the vehicle;
in response to determining that the authority vehicle is moving towards the vehicle, increasing an amount of Lidar data, image data, and radar data to be analyzed;
based on the analysis of the Lidar data, the image data, and the radar data, determine whether the authority vehicle is moving from an opposite direction relative to the vehicle;
in response to determining that the authority vehicle is moving from an opposite direction, determine whether a barrier prevents the authority vehicle from crossing a travel path of the vehicle;
determine whether to initiate a vehicle response measure based at least in part on the location of the authority vehicle in relation to the vehicle, and whether a barrier prevents the authority vehicle from crossing a travel path of the vehicle; and
selectively initiate the vehicle response measure, the selective initiating comprising:
refraining from initiating a vehicle response measure in response to determining that a barrier prevents the authority vehicle from crossing a travel path of the vehicle; and
initiating a vehicle response measure in response to determining:
an absence of a barrier; or
a gap, in a barrier, between the vehicle and the authority vehicle through which the authority vehicle potentially traverses.

11. The system of claim 10, wherein the determining of the one or more signal characteristics of the acoustic signal comprises determining at least one a sound intensity of the acoustic signal, or a phase of the acoustic signal.

12. The system of claim 11, wherein the determining of the one or more signal characteristics of the acoustic signal comprises determining the frequency of the acoustic signal, and wherein the determining of whether the authority vehicle is moving towards the vehicle comprises:
determining the expected frequency of the acoustic signal;
determining that the frequency of the acoustic signal is greater than the expected frequency of the acoustic signal; and
determining that the authority vehicle is moving towards the vehicle responsive at least in part to determining that the frequency of the acoustic signal is greater than the expected frequency of the acoustic signal.

13. The system of claim 11, wherein the acoustic signal is a first acoustic signal, wherein the at least one processor is configured to determine the one or more signal characteristics of the first acoustic signal by executing the computer-executable instructions to determine the sound intensity of the first acoustic signal, and wherein the at least one processor is further configured to execute the computer-executable instructions to:
receive, at the one or more audio capture devices, a second acoustic signal emitted from the signal source associated with the authority vehicle, wherein the first acoustic signal is emitted, at least in part, when the authority vehicle is at a first location at a first time period and the second acoustic signal is emitted, at least in part, when the authority vehicle is at a second location different from the first location at a second time period after the first time period; and
determine a sound intensity of the second acoustic signal.

14. The system of claim 13, wherein the determining of whether the authority vehicle is moving towards the vehicle comprises:
determining that the sound intensity of the second acoustic signal is greater than the sound intensity of the first acoustic signal; and
determine that the authority vehicle is moving towards the vehicle responsive at least in part to determining that the sound intensity of the second acoustic signal is greater than the sound intensity of the first acoustic signal.

15. The system of claim 11, wherein the acoustic signal is received at a first audio capture device, wherein the at least one processor is configured to determine the one or more signal characteristics of the acoustic signal by executing the computer-executable instructions to determine the phase of the acoustic signal, wherein the phase is a first phase of the acoustic signal, and wherein the at least one processor is further configured to execute the computer-executable instructions to:
receive the acoustic signal at a second audio capture device; and
determine a second phase of acoustic signal.

16. The system of claim 15, wherein the at least one processor is further configured to execute the computer-executable instructions to:
determine a relative phase difference between the first phase of the acoustic signal and the second phase of the acoustic signal;
determine, based at least in part on the relative phase difference, a difference in time of receipt of the acoustic signal at the first audio capture device and time of receipt of the acoustic signal at the second audio capture device;
determine a location of the authority vehicle in relation to the vehicle responsive, at least in part, to determining the difference in time of receipt of the acoustic signal at the first audio capture device and time of receipt of the acoustic signal at the second audio capture device; and
the determining of whether to initiate a vehicle response measure is based at least in part on the location of the authority vehicle in relation to the vehicle, direction of movement of the authority vehicle, and additional sensor data.

17. A computer program product for determining a direction of movement of an authority vehicle in relation to a vehicle, the computer program product comprising a non-transitory computer-readable medium readable by a processing circuit, the non-transitory computer-readable medium storing instructions executable by the processing circuit to cause a method to be performed, the method comprising:

receiving, at one or more audio capture devices associated with the vehicle, an acoustic signal emitted from a signal source associated with the authority vehicle;

determining one or more signal characteristics of the acoustic signal, the determining comprising comparing a frequency of the acoustic signal against an expected frequency;

determining, based on the comparison, whether the authority vehicle is moving towards the vehicle;

in response to determining that the authority vehicle is moving towards the vehicle, increasing an amount of Lidar data, image data, and radar data to be analyzed;

based on the analysis of the Lidar data, the image data, and the radar data, determining whether the authority vehicle is moving from an opposite direction relative to the vehicle;

in response to determining that the authority vehicle is moving from an opposite direction, determining whether a barrier prevents the authority vehicle from crossing a travel path of the vehicle;

determining whether to initiate a vehicle response measure based at least in part on the location of the authority vehicle in relation to the vehicle, and whether a barrier prevents the authority vehicle from crossing a travel path of the vehicle; and selectively initiating the vehicle response measure, the selective initiating comprising:
  refraining from initiating a vehicle response measure in response to determining that a barrier prevents the authority vehicle from crossing a travel path of the vehicle; and
  initiating a vehicle response measure in response to determining:
    an absence of a barrier; or
    a gap, in a barrier, between the vehicle and the authority vehicle through which the authority vehicle potentially traverses.

18. The computer program product of claim 17, wherein determining of whether the authority vehicle is moving towards the vehicle comprises determining that the authority vehicle is moving towards the vehicle, the initiating of a vehicle response measure comprising at least one of an automated braking operation, an automated lane changing operation, and an automated navigation route modification.

\* \* \* \* \*